US007980621B2

(12) United States Patent
Elliott et al.

(10) Patent No.: US 7,980,621 B2
(45) **Date of Patent: *Jul. 19, 2011**

(54) VEHICLE REAR DOOR ARTICULATING MECHANISM

(75) Inventors: Adrian N. A. Elliott, Dearborn, MI (US); Justin T. Johnson, Dearborn, MI (US); Jason Falenski, Berkley, MI (US); Craig Blust, Oakland, MI (US); Dave M. Lechkun, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

This patent is subject to a terminal disclaimer.

(21) Appl. No.: 12/022,276

(22) Filed: Jan. 30, 2008

(65) Prior Publication Data

US 2009/0072582 A1 Mar. 19, 2009

Related U.S. Application Data

(60) Provisional application No. 60/972,567, filed on Sep. 14, 2007.

(51) Int. Cl.
*B60J 5/04* (2006.01)

(52) U.S. Cl. .................................................. 296/146.12

(58) Field of Classification Search ............. 296/146.11, 296/146.12
See application file for complete search history.

(56) References Cited

U.S. PATENT DOCUMENTS 3,051,999 A 9/1962 Schimek
3,075,803 A 1/1963 Wilfert
3,313,063 A 4/1967 Patin
3,619,853 A 11/1971 Merrill
3,628,216 A 12/1971 Savell
3,758,990 A 9/1973 Balanos
3,935,674 A 2/1976 Williams et al.
4,025,104 A 5/1977 Grossbach et al.
4,135,760 A 1/1979 Grossbach
4,719,665 A * 1/1988 Bell ......................... 296/146.11
4,945,677 A 8/1990 Kramer
5,139,307 A 8/1992 Koops et al.
5,251,953 A 10/1993 Willey
5,398,988 A 3/1995 DeRees et al.
5,474,344 A * 12/1995 Lee ............................... 292/262
5,507,119 A 4/1996 Sumiya et al.
5,561,887 A * 10/1996 Neag et al. ....................... 16/334
5,685,046 A * 11/1997 Neag et al. ....................... 16/366
5,812,684 A 9/1998 Mark (Continued)

FOREIGN PATENT DOCUMENTS

DE 3831698 A1 3/1990

(Continued)

*Primary Examiner* — H Gutman
(74) *Attorney, Agent, or Firm* — Gregory P. Brown; Price, Heneveld, Cooper, DeWitt & Litton, LLP

(57) ABSTRACT

A vehicle rear door unsequenced articulating mechanism including one or more articulating hinge assemblies having one or more hinge arms pivotally mounted to a vehicle C-pillar at one end thereof via a C-pillar hinge mount and pivotally mounted to a vehicle rear door at another end thereof via a door hinge mount. The hinge arm may include a generally J-shaped profile between the ends thereof for permitting unsequenced articulation of the rear door up to approximately 180° from a rear door closed position. The door hinge mount may include a door stop engageable with a stop surface on the hinge arm for limiting pivotal movement of the vehicle rear door.

22 Claims, 20 Drawing Sheets

U.S. PATENT DOCUMENTS

| | | | | |
|---|---|---|---|---|
| 5,846,463 | A | 12/1998 | Keeney et al. | |
| 5,896,704 | A | 4/1999 | Neag et al. | |
| 5,921,613 | A | 7/1999 | Breunig et al. | |
| 6,030,025 | A | 2/2000 | Kanerva | |
| 6,036,257 | A | 3/2000 | Manuel | |
| 6,183,039 | B1 | 2/2001 | Kohut et al. | |
| 6,196,618 | B1 | 3/2001 | Pietryga et al. | |
| 6,213,535 | B1 | 4/2001 | Landmesser et al. | |
| 6,299,235 | B1 | 10/2001 | Davis et al. | |
| 6,305,737 | B1 * | 10/2001 | Corder et al. | 296/146.11 |
| 6,382,705 | B1 | 5/2002 | Lang et al. | |
| 6,394,529 | B2 | 5/2002 | Davis et al. | |
| 6,447,054 | B1 | 9/2002 | Pietryga et al. | |
| 6,572,176 | B2 | 6/2003 | Davis et al. | |
| 6,609,748 | B1 | 8/2003 | Azzouz et al. | |
| 6,629,337 | B2 | 10/2003 | Nania | |
| 6,793,268 | B1 | 9/2004 | Faubert et al. | |
| 6,802,154 | B1 | 10/2004 | Holt et al. | |
| 6,817,651 | B2 | 11/2004 | Carvalho et al. | |
| 6,826,869 | B2 | 12/2004 | Oberheide | |
| 6,860,543 | B2 | 3/2005 | George et al. | |
| 6,896,315 | B2 | 5/2005 | Batinli et al. | |
| 6,913,308 | B2 * | 7/2005 | Azzouz et al. | 296/146.1 |
| 6,926,342 | B2 | 8/2005 | Pommeret et al. | |
| 6,938,303 | B2 * | 9/2005 | Watson et al. | 16/334 |
| 6,942,277 | B2 * | 9/2005 | Rangnekar et al. | 296/146.11 |
| 6,997,504 | B1 * | 2/2006 | Lang et al. | 296/146.11 |
| 7,000,977 | B2 | 2/2006 | Anders | |
| 7,003,915 | B2 | 2/2006 | Yokomori | |
| 7,032,953 | B2 | 4/2006 | Rangnekar et al. | |
| 7,104,588 | B2 | 9/2006 | George et al. | |
| 7,168,753 | B1 | 1/2007 | Faubert et al. | |
| 7,178,853 | B2 | 2/2007 | Oxley et al. | |
| 7,219,948 | B2 | 5/2007 | Curtis, Jr. et al. | |
| 7,243,978 | B2 | 7/2007 | Mather et al. | |
| 7,383,614 | B2 * | 6/2008 | Matsuki | 16/86 B |
| 7,393,044 | B2 | 7/2008 | Enomoto | |
| 7,469,944 | B2 * | 12/2008 | Kitayama et al. | 292/262 |
| 7,552,953 | B2 * | 6/2009 | Schmoll et al. | 292/267 |
| 7,611,190 | B1 | 11/2009 | Elliott et al. | |
| 7,636,985 | B2 * | 12/2009 | Greenbank | 16/389 |
| 7,640,627 | B2 * | 1/2010 | Lowen et al. | 16/86 C |
| RE41,143 | E * | 2/2010 | Rangnekar et al. | 296/146.11 |
| 7,658,438 | B1 | 2/2010 | Elliott et al. | |
| 2002/0096800 | A1 | 7/2002 | Keeney et al. | |
| 2003/0218358 | A1 | 11/2003 | Hahn | |
| 2005/0093337 | A1 | 5/2005 | Herrmann et al. | |
| 2005/0116496 | A1 | 6/2005 | Lowson et al. | |
| 2005/0146159 | A1 | 7/2005 | Shen et al. | |
| 2006/0059799 | A1 | 3/2006 | Zimmer et al. | |
| 2006/0103047 | A1 | 5/2006 | Zwolinski | |
| 2006/0249983 | A1 | 11/2006 | Heuel et al. | |
| 2006/0267375 | A1 | 11/2006 | Enomoto | |
| 2007/0075565 | A1 | 4/2007 | Magsaam | |
| 2007/0085374 | A1 | 4/2007 | Mather et al. | |
| 2007/0214606 | A1 | 9/2007 | Hoffman | |
| 2008/0190028 | A1 | 8/2008 | Oxley | |
| 2008/0224501 | A1 | 9/2008 | Zimmer et al. | |
| 2009/0000200 | A1 | 1/2009 | Heuel et al. | |
| 2009/0051194 | A1 | 2/2009 | Elliott et al. | |
| 2009/0070960 | A1 * | 3/2009 | Elliott et al. | 16/334 |
| 2009/0072583 | A1 | 3/2009 | Elliott et al. | |
| 2009/0200833 | A1 | 8/2009 | Heuel et al. | |
| 2010/0127530 | A1 | 5/2010 | Elliott et al. | |
| 2010/0154313 | A1 | 6/2010 | Elliott et al. | |
| 2010/0171336 | A1 | 7/2010 | Elliott et al. | |

FOREIGN PATENT DOCUMENTS

| | | | |
|---|---|---|---|
| DE | 102004039885 | A1 | 2/2006 |
| EP | 0012511 | A1 | 6/1980 |
| EP | 0875434 | A1 | 11/1998 |
| EP | 0957019 | A2 | 11/1999 |
| EP | 1813759 | A1 | 8/2007 |
| GB | 389061 | | 5/1931 |
| JP | 3140583 | A | 6/1991 |
| JP | 3140584 | A | 6/1991 |
| JP | 2004175199 | A | 6/2004 |
| JP | 2005153738 | A | 6/2005 |
| JP | 2007138630 | A | 6/2007 |
| JP | 2008094323 | A | 4/2008 |
| KR | 100448753 | B1 | 9/2004 |
| WO | 0242589 | A1 | 5/2002 |
| WO | 2006005572 | A1 | 1/2006 |

* cited by examiner

VEHICLE REAR DOOR ARTICULATING MECHANISM

RELATED APPLICATIONS

This application claims benefit of priority of Provisional Application Ser. No. 60/972,567 filed Sep. 14, 2007, hereby incorporated by reference in its entirety.

BACKGROUND OF INVENTION a. Field of Invention

The invention relates generally to vehicle door movement control devices, and, more particularly, to a mechanism for vehicle rear door articulation, for example, in a pickup truck, with the mechanism permitting unsequenced opening or closing articulation of up to 180° of a rear door.

b. Description of Related Art

As is known in the art, automobile designs are governed by a variety of ergonomic and operational factors. For doors and other such components, the design is generally based on ergonomic factors such as exterior appearance, and the location and visibility of hinges, latches and adjacent components, and operational factors such as the ingress/egress opening provided, the maximum clearance required for opening/closing a door, and crash performance.

For pickup trucks, sport-utility vehicles (SUVs) and other such vehicles which are designed to accommodate ingress/egress of several passengers and also provide means for transport of large goods, the ingress/egress opening and maximum clearance required for opening/closing a door can be of particular importance. For example, a typical pickup truck having front and back driver/passenger doors may include a C-pillar mounted rear door which pivots relative to the C-pillar in a similar manner as the A-pillar mounted front door to thus provide a relatively large and unobstructed ingress/egress opening without the intermediate B-pillar. In typical pickup trucks, the rear door pivots approximately 90°, thus limiting the ingress/egress area for occupants or for loading/unloading of objects. The access and loading is made particularly difficult, if not impossible, if a vehicle is parked adjacent to the truck and is sufficiently close to prevent an occupant from boarding or loading to enter the area between the front and rear door (when open), invariably known as parking lot entrapment.

In an effort to address such parking lot entrapment concerns, a host of pivoting rear door designs, such as the design disclosed in U.S. Pat. No. 7,032,953 to Rangnekar, have been proposed.

Specifically, referring to FIGS. 5 and 7-13 of Rangnekar, Rangnekar discloses a vehicle door hinge assembly (40) configured and arranged such that rear door (20) is swingably mounted to door mounting pillar (24) for movement between a closed position to a first open position in which the door pivots approximately 90° relative to the closed position about first vertical pivot axis (A1). After reaching the first open position, door hinge assembly (40) is configured such that rear door (20) then pivots about second vertical pivot axis (A2) to open approximately 170° relative to the closed position.

Thus, whereas the hinge assembly (40) of Rangnekar provides for pivoting of rear door (20) up to 170°, as is readily evident from FIGS. 7-13 of Rangnekar, assembly (40) is relatively complex in design and may thus be readily susceptible to failure due to the number of components. More importantly, as discussed above, assembly (40) first allows for pivoting of door (20) to approximately 90° and thereafter to approximately 170°. The 90° stop is provided by latch mechanism (50) (see FIGS. 11, 12) which operates in a sequenced open/close manner, thus limiting the position from which door (20) can be opened/closed if additional intermediate stops are needed.

It would therefore be of benefit to provide a mechanism for permitting opening and closing of a rear door that is not sequenced to open/close in a set manner, but can be opened/closed through rotation of a door or the hinge in any order, and in continuous increments of either operation. It would also be of benefit to provide a mechanism that includes a minimal number of components, thus simplifying the overall design, operation and reducing the related design and assembly costs for the mechanism.

SUMMARY OF INVENTION

The invention overcomes the drawbacks and deficiencies of prior art articulating door mechanisms by providing a vehicle rear door unsequenced articulating mechanism including one or more articulating hinge assemblies having one or more hinge arms pivotally mounted to a vehicle C-pillar at one end thereof via a C-pillar hinge mount and pivotally mounted to a vehicle rear door at another end thereof via a door hinge mount. The hinge arm may include a generally J-shaped profile between the ends thereof for permitting unsequenced articulation of the rear door up to approximately 180° from a rear door closed position (it should be noted that design constraints (i.e. desired door opening, vehicle body design) may direct the opening to be nominally less than 180° (i.e. 170°) for optimized operation). The door hinge mount may include a door stop engageable with a stop surface on the hinge arm for limiting pivotal movement of the vehicle rear door.

In an exemplary embodiment, the vehicle rear door articulating mechanism may allow a rear door, with a front door being opened, to be opened to approximately 180° and positioned away from the door opening, generally parallel to the vehicle body (i.e. a truck box quarter panel in the embodiment described herein), for facilitating ease of ingress and egress and allowing maximum access for loading and unloading of transportable items. The invention differs from conventional two-stage hinge assemblies in that it is not sequenced to open/close in a set manner, but can be opened/closed through rotation of the rear door or an articulating hinge assembly in any order, and in continuous increments of either operation. This operation simplifies the design of the rear door, the build of the articulating hinge assembly, reduces the cost of the assembly, and simplifies operation, allowing the rear door to be opened/closed more easily from any position. In an exemplary embodiment, the articulating hinge assembly may include a dual hinge with an integrated tie-bar, connected to the rear end of the rear door and for connection to a C-pillar of a vehicle body. In the exemplary case of a truck, a hinge mount to the truck body may be to the existing C-pillar without modification of the vehicle structure. The articulating hinge assembly may allow rotation of the first or second stage of the opening articulation to take place in sequence or concurrently to the maximum opening of either to enable the door to achieve a full open position of up to approximately 180° from the closed to the fully open position of the rear door.

For the vehicle rear door unsequenced articulating mechanism described above, the mechanism may further include a tie-bar connected to an upper and lower hinge arm for thereby providing rigidity for simultaneous operation of upper and lower hinge assemblies. One or more door check straps may be pivotally connected to the tie-bar, with the door check strap including one or more recesses engageable with a detent in a vehicle body for maintaining the rear door at a predetermined angle relative to the rear door initial closed position. In a particular embodiment, one or more door check straps may be pivotally connected to the tie-bar, with the door check strap including one or more recesses engageable with a detent provided in the rear door for maintaining the rear door at a predetermined angle relative to the rear door initial closed position. Moreover, in a particular embodiment, one or more door check straps may be pivotally connected to the tie-bar, with the door check strap including one or more recesses engageable with a detent provided in the vehicle C-pillar for maintaining the rear door at a predetermined angle relative to the rear door initial closed position. Yet further, in a particular embodiment, one or more first and second door check straps may be pivotally connected to the tie-bar, with the first and second door check straps each including one or more recesses and each recess being respectively engageable with a detent provided in the rear door and the vehicle C-pillar for maintaining the rear door at predetermined angles relative to the rear door initial closed position and allowing unsequenced pivotal movement of the rear door between rear door opening and closing directions, with the predetermined angles being selectable by a user based on a force applied for opening and closing the rear door. For the particular embodiment including first and second door check straps, the first door check strap may include two recesses, and the second door check strap may include one recess, with the recesses permitting unsequenced pivotal movement of the rear door between the rear door opening and closing directions.

The invention also provides a vehicle door unsequenced articulating mechanism including one or more articulating hinge assemblies having one or more hinge arms pivotally mounted to a vehicle body structure at one end thereof via a body structure hinge mount and pivotally mounted to a vehicle door at another end thereof via a door hinge mount. The hinge arm may include a generally curved profile between the ends thereof for permitting unsequenced articulation of the door up to a predetermined angle from a door closed position. The door hinge mount may include a door stop engageable with a stop surface on the hinge arm for limiting pivotal movement of the vehicle door.

For the vehicle door unsequenced articulating mechanism described above, the mechanism may further include a tie-bar connected to an upper and lower hinge arm for thereby providing rigidity for simultaneous operation of upper and lower hinge assemblies. One or more door check straps may be pivotally connected to the hinge assembly, with the door check strap including one or more recesses engageable with a detent in a vehicle body for maintaining the door at a predetermined angle relative to the door initial closed position. In a particular embodiment, one or more door check straps may be pivotally connected to the hinge assembly, with the door check strap including one or more recesses engageable with a detent provided in the door for maintaining the door at a predetermined angle relative to the door initial closed position. Moreover, in a particular embodiment, one or more door check straps may be pivotally connected to the hinge assembly, with the door check strap including one or more recesses engageable with a detent provided in the vehicle body structure for maintaining the door at a predetermined angle relative to the door initial closed position. Yet further, in a particular embodiment, one or more first and second door check straps may be pivotally connected to the hinge assembly, with the first and second door check straps each including one or more recesses and each recess being respectively engageable with a detent provided in the door and the vehicle body structure for maintaining the door at predetermined angles relative to the door initial closed position and allowing unsequenced pivotal movement of the door between door opening and closing directions, with the predetermined angles being selectable by a user based on a force applied for opening and closing the door. For the particular embodiment including first and second door check straps, the first door check strap may include two recesses, and the second door check strap may include one recess, with the recesses permitting unsequenced pivotal movement of the door between the door opening and closing directions.

The invention yet further provides a vehicle compartment closure unsequenced articulating mechanism having one or more articulating hinge assemblies having one or more hinge arms pivotally mounted to a vehicle body structure at one end thereof via a body structure hinge mount and pivotally mounted to a vehicle compartment closure at another end thereof via a door hinge mount. The hinge arm may include a generally curved profile between the ends thereof for permitting unsequenced articulation of the compartment closure up to a predetermined angle from a compartment closure closed position. The door hinge mount may include a door stop engageable with a stop surface on the hinge arm for limiting pivotal movement of the vehicle compartment closure.

For the vehicle compartment closure unsequenced articulating mechanism described above, the mechanism may further include a tie-bar connected to first and second hinge arms for thereby providing rigidity for simultaneous operation of first and second hinge assemblies. One or more door check straps may be pivotally connected to the hinge assembly, with the door check strap including one or more recesses engageable with a detent in a vehicle body for maintaining the compartment closure at a predetermined angle relative to the compartment closure initial closed position. In a particular embodiment, one or more door check straps may be pivotally connected to the hinge assembly, with the door check strap including one or more recesses engageable with a detent provided in the compartment closure for maintaining the compartment closure at a predetermined angle relative to the compartment closure initial closed position. Moreover, in a particular embodiment, one or more door check straps may be pivotally connected to the hinge assembly, with the door check strap including one or more recesses engageable with a detent provided in the vehicle body structure for maintaining the compartment closure at a predetermined angle relative to the compartment closure initial closed position. Yet further, in a particular embodiment, one or more first and second door check straps may be pivotally connected to the hinge assembly, with the first and second door check straps each including one or more recesses and each recess being respectively engageable with a detent provided in the compartment closure and the vehicle body structure for maintaining the compartment closure at predetermined angles relative to the compartment closure initial closed position and allowing unsequenced pivotal movement of the compartment closure between compartment closure opening and closing directions, with the predetermined angles being selectable by a user based on a force applied for opening and closing the compartment closure. For the particular embodiment including first and second door check straps, the first door check strap may include two recesses, and the second door check strap may include one recess, with the recesses permitting unsequenced pivotal movement of the compartment closure between the compartment closure opening and closing directions.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 1:
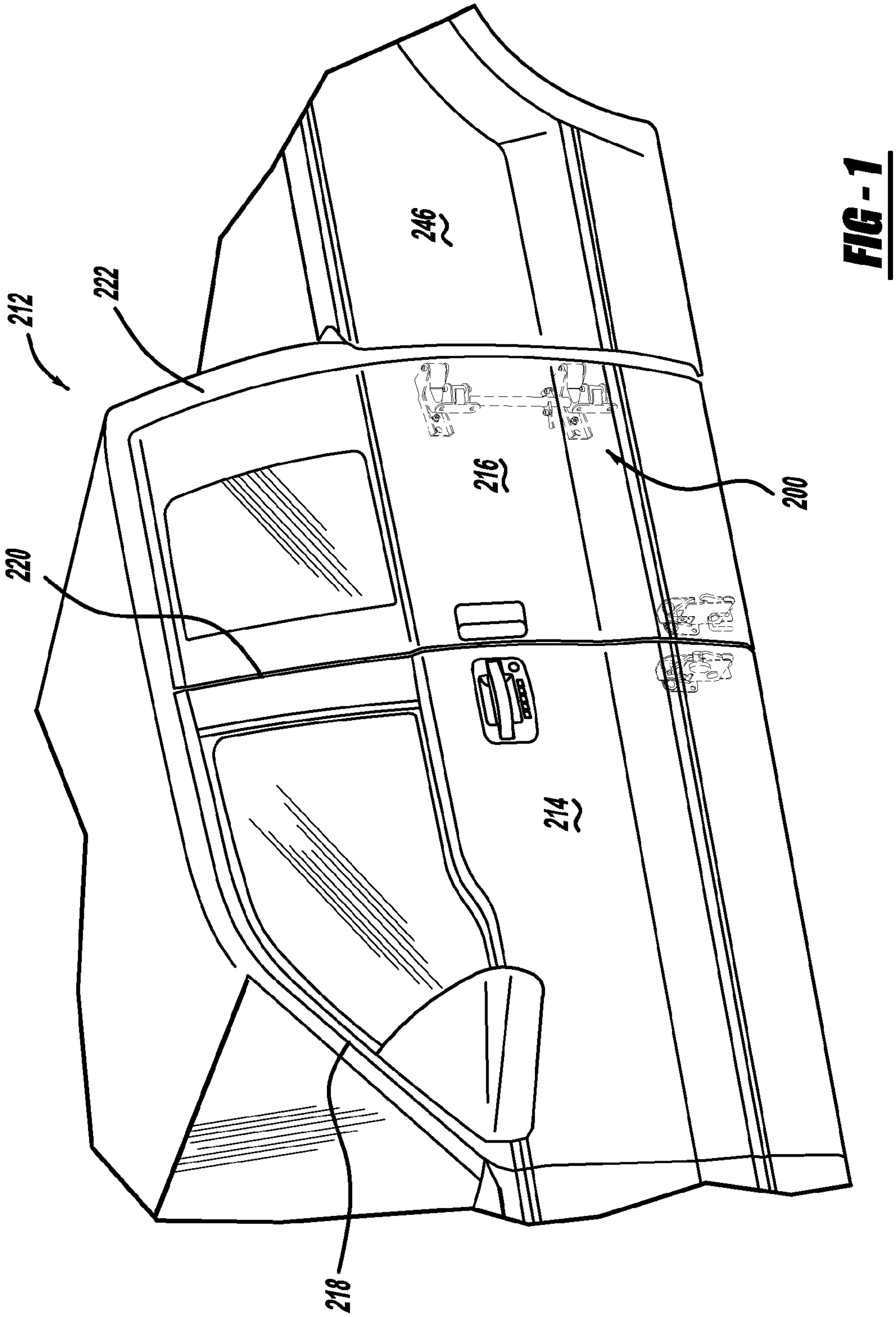
FIG. 1 is an isometric view of a rear door articulating mechanism according to the present invention, illustrating the mechanism in an assembled configuration and installed onto a vehicle (the mechanism being shown in phantom)

Referring now to the drawings wherein like reference numerals designate corresponding parts throughout the several views, FIGS. 1-12 illustrate a mechanism for vehicle rear door articulation according to the present invention, generally designated "rear door articulating mechanism 200."

Figure 2:
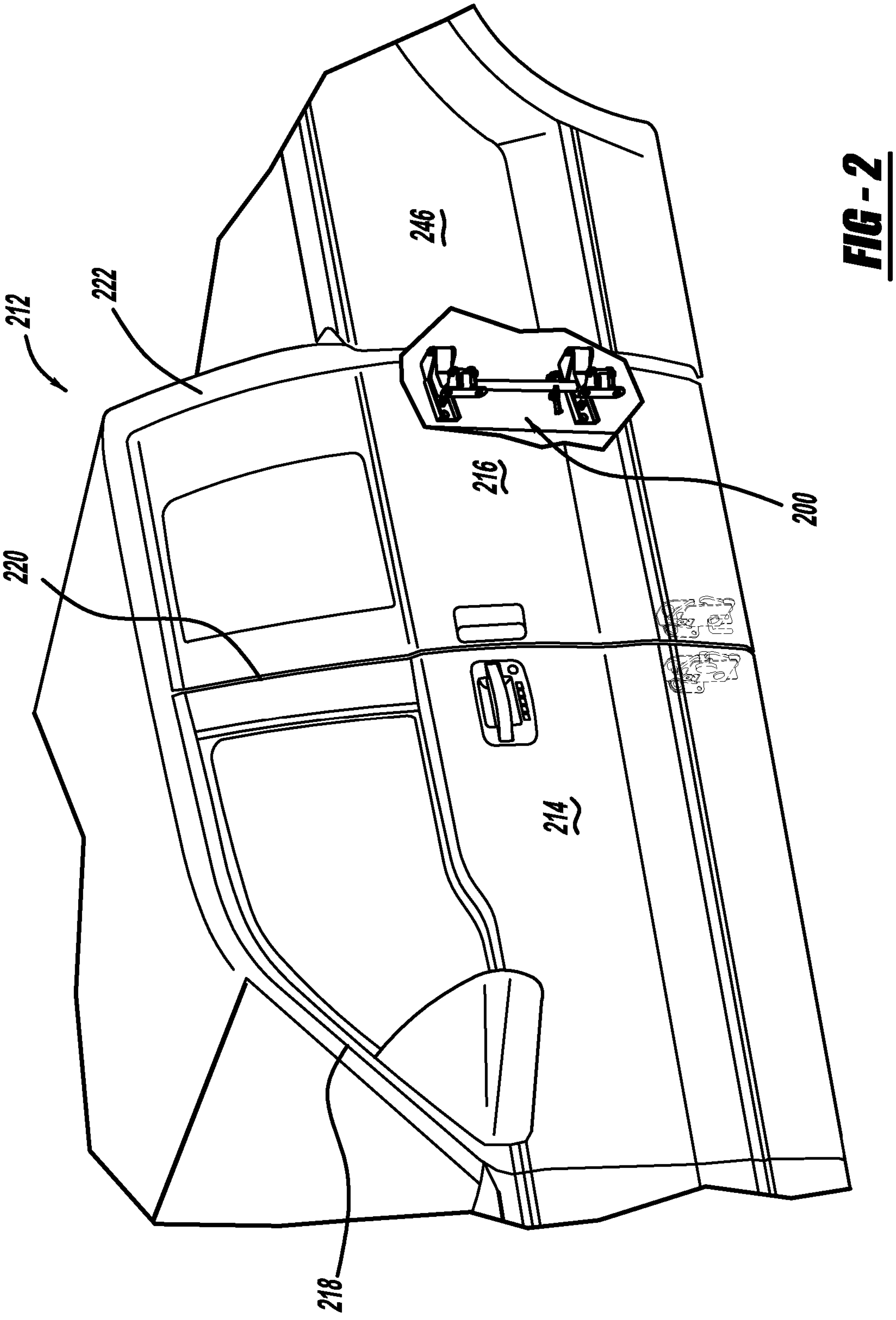
FIG. 2 is an isometric cutout view of the rear door articulating mechanism of FIG. 1, illustrating the mechanism installed onto a vehicle.
Figure 3:
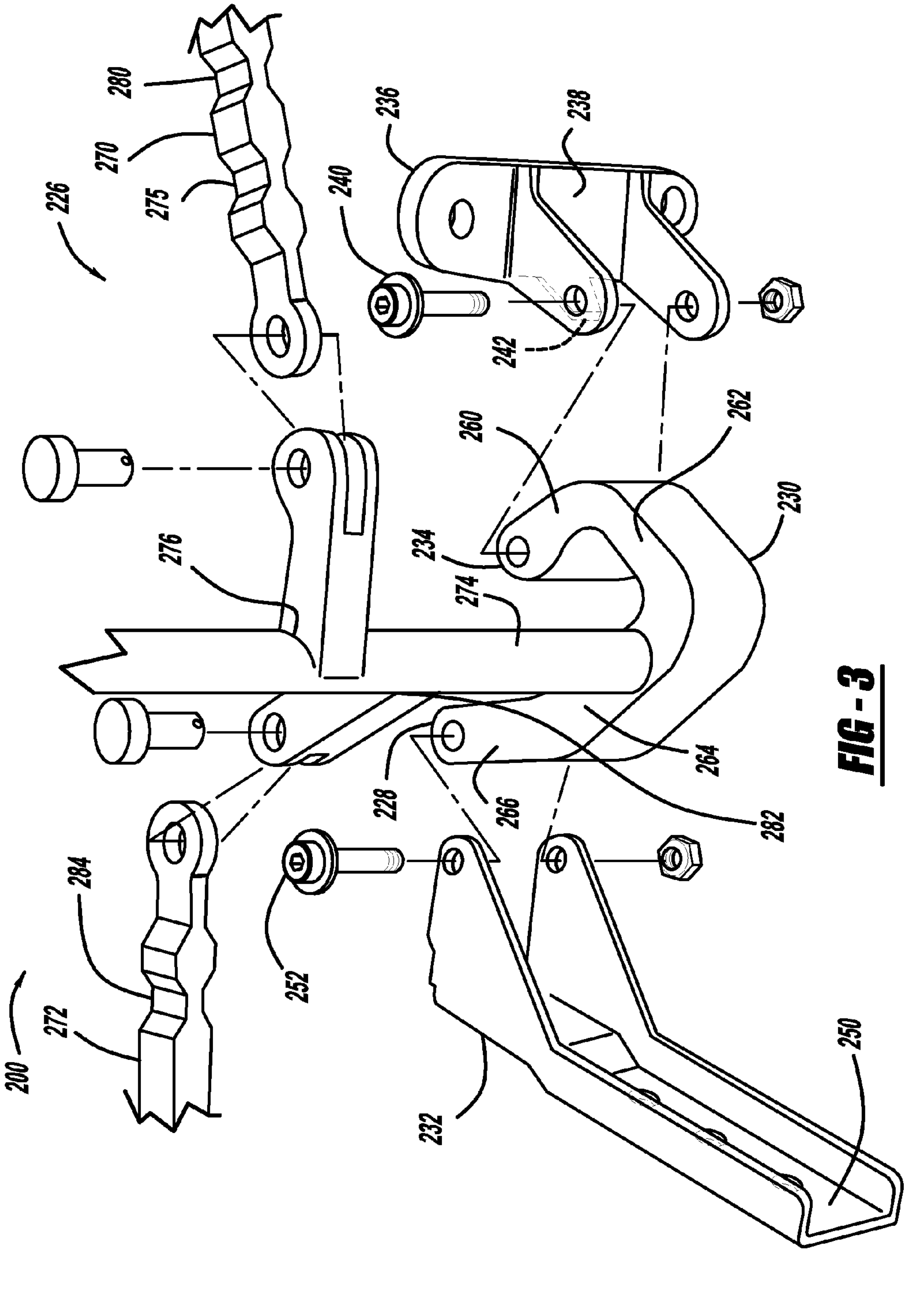
FIG. 3 is an exploded view of the rear door articulating mechanism of FIG. 1, illustrating the various sub-components of the mechanism.
Figure 4:
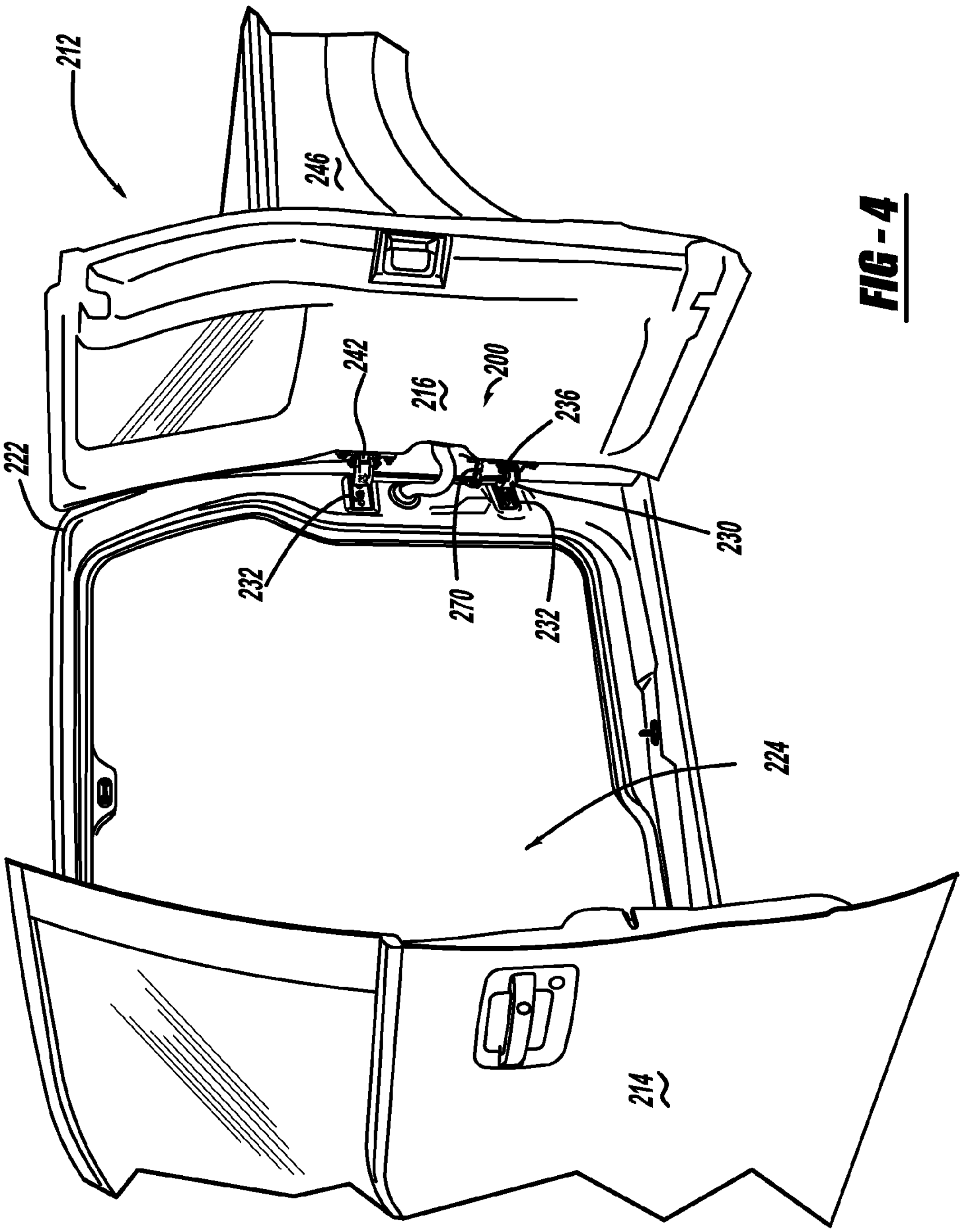
FIG. 4 is an isometric view of the rear door articulating mechanism of FIG. 1, illustrating the mechanism installed onto a vehicle and with a front vehicle door fully open and a rear vehicle door opened approximately 125° relative to the rear door initial closed position.
Figure 5:
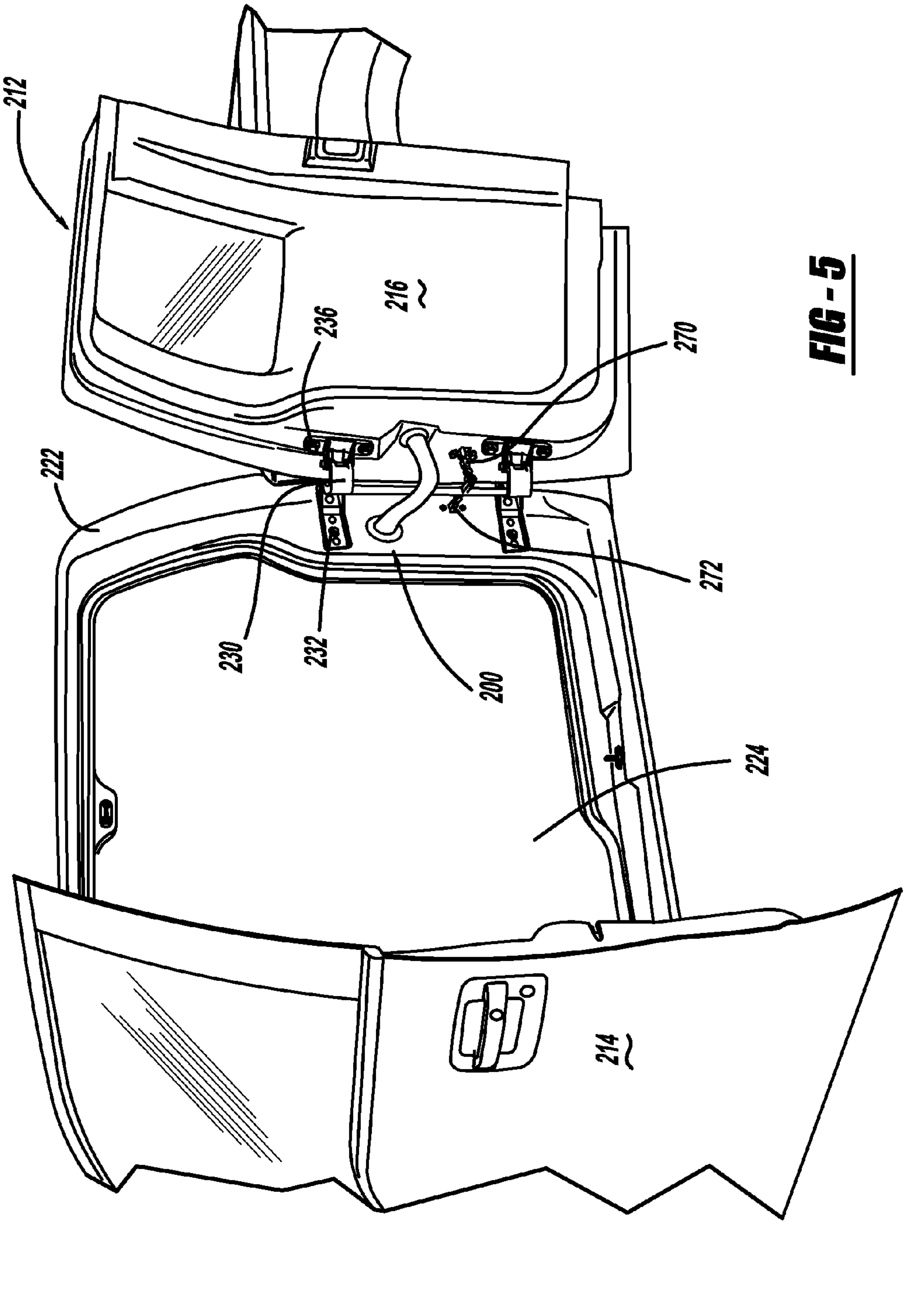
FIG. 5 is an isometric view of the rear door articulating mechanism of FIG. 1, illustrating the mechanism installed onto a vehicle and with the front and rear vehicle doors fully opened (i.e. rear door opened approximately 180° relative to the rear door initial closed position)
Figure 6A:
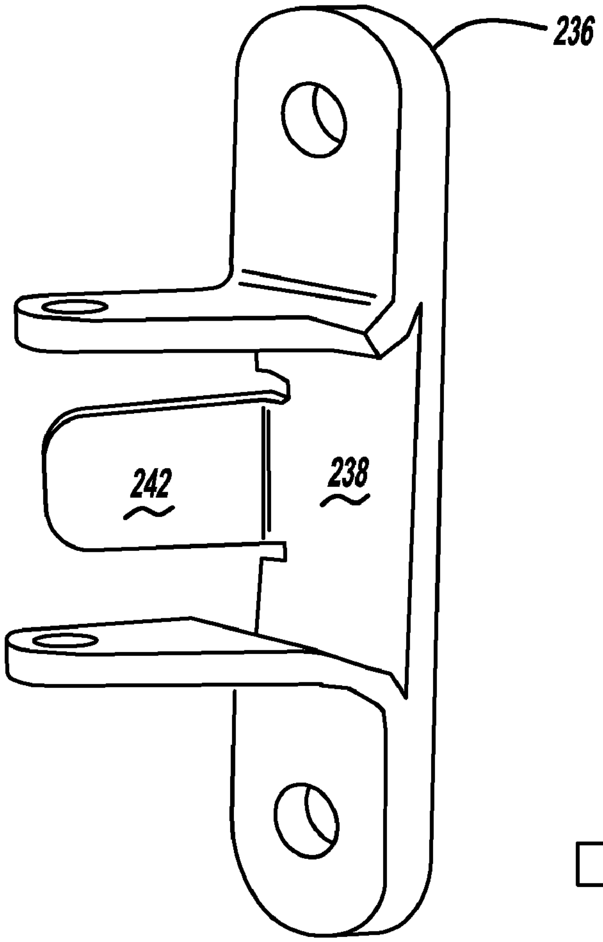
FIG. 6A is an enlarged isometric view of a door hinge mount for attachment of the rear door articulating mechanism of FIG. 1 to a vehicle rear door.
Figure 6B:
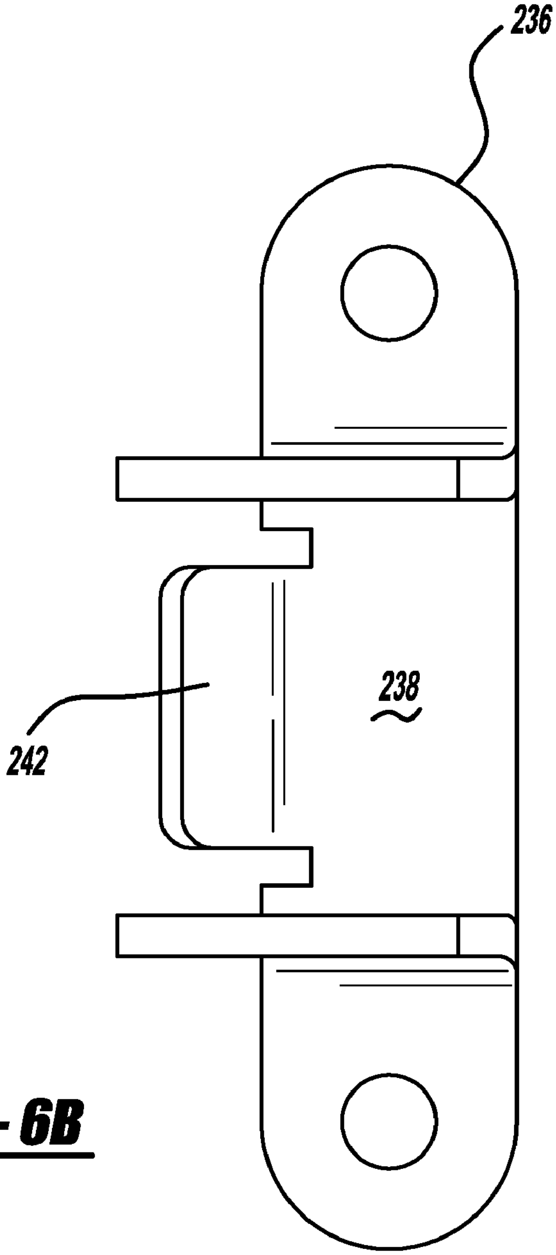
FIGS. 6B-6D are respectively enlarged front, top and right side views of the door hinge mount of FIG. 6A.
Figure 6C:
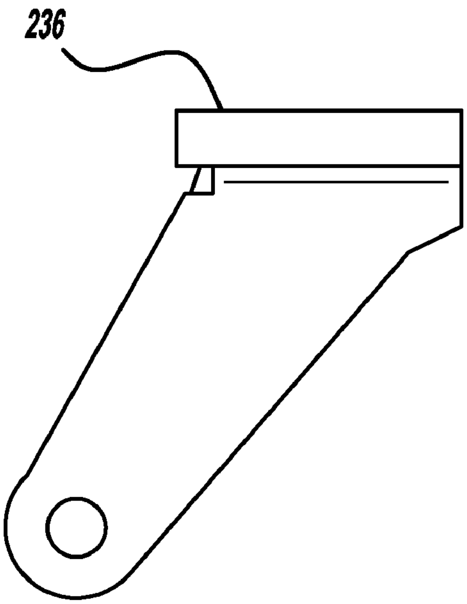
Figure 6D:
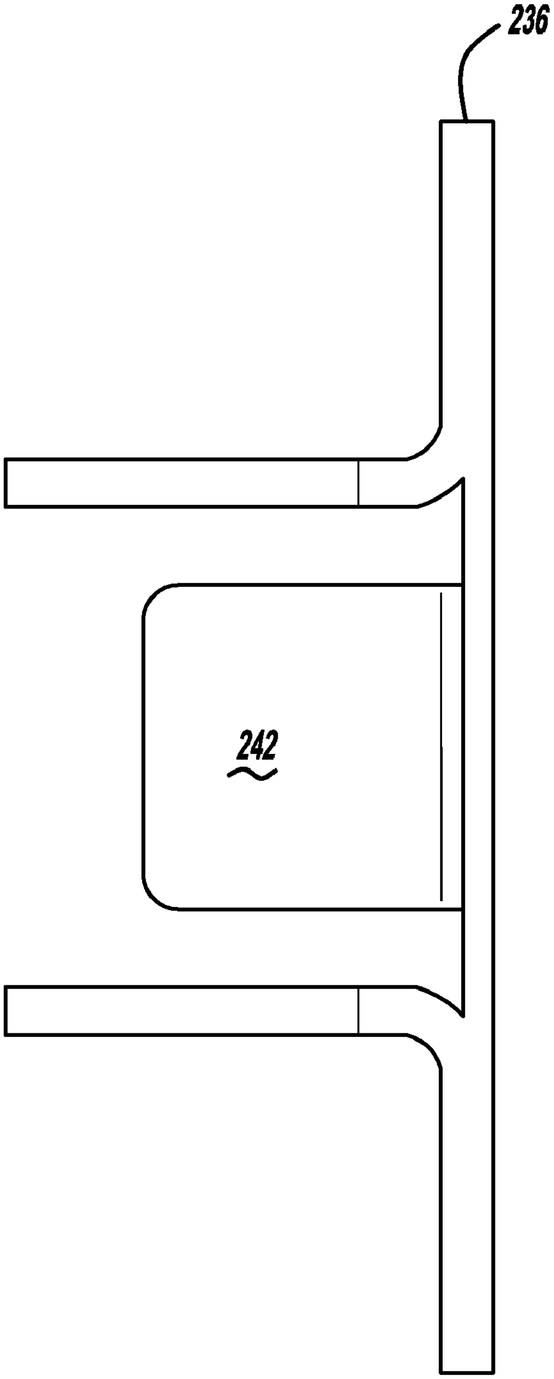

Referring to FIGS. 1-3, rear door articulating mechanism 200 may generally be mounted onto a vehicle 212 including front and rear doors 214, 216. In the exemplary embodiment illustrated, vehicle 212 may be a pickup truck including A, B and C pillars 218, 220, 222. As shown in FIGS. 4 and 5, and described in greater detail below, in order to facilitate ingress and egress into and from compartment 224 of vehicle 212, rear door articulating mechanism 200 may allow for complete opening of rear door 216 at up to 180° (or less based on the design of the components as would be readily evident to those skilled in the art) relative to the rear door initial closed position, and subsequent closing of the rear door without a predetermined closing sequence.

The various sub-components of rear door articulating mechanism 200 will now be described in detail with reference to FIGS. 1-8C.

Specifically, rear door articulating mechanism 200 may generally include an articulating hinge assembly 226 pivotally mounted at end 228 of a curved hinge arm 230 to C-pillar 222 via C-pillar hinge mount 232 and further pivotally mounted at end 234 of hinge arm 230 to rear door 216 via door hinge mount 236. Those skilled in the art would readily appreciate in view of this disclosure that mechanism 200 may be installed onto a vehicle D-pillar (not shown), or another body structure for facilitating articulated opening/closing of a door or another cover.

Door hinge mount 236 may include a door mount bracket 238 for attachment of door hinge mount 236 to rear door 216 by means of screws, bolts, or by other means such as welding and the like. Door hinge mount 236 may also include pivot pin 240 for pivotal connection at end 234 of hinge arm 230. As shown in FIG. 3, a door stop 242 may be provided on door hinge mount 236 and engageable with stop surface 244 of hinge arm 230 in the rear door fully open position of FIGS. 5 and 10D at which door 216 is disposed at approximately 180° relative to its initial closed position. In this position, the engagement of door stop 242 and stop surface 244 prevents further rotation of rear door 216 to thus prevent contact of door 216 with vehicle body 246.

Figure 8A:
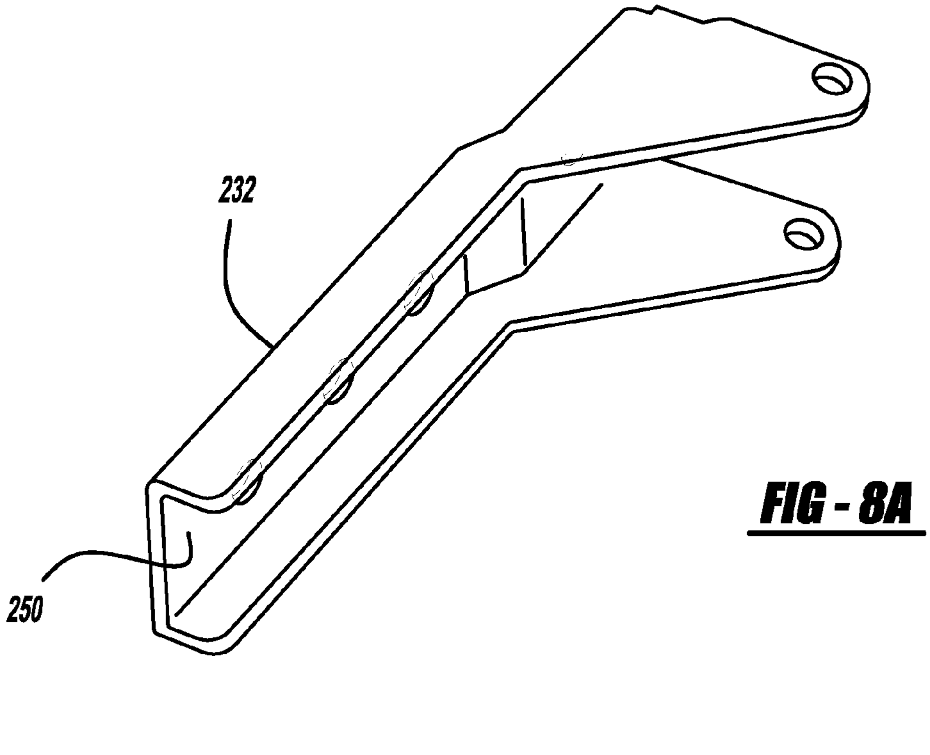
FIG. 8A is an enlarged isometric view of a C-pillar hinge mount for attachment of the rear door articulating mechanism of FIG. 1 to a vehicle C-pillar.
Figure 8B:
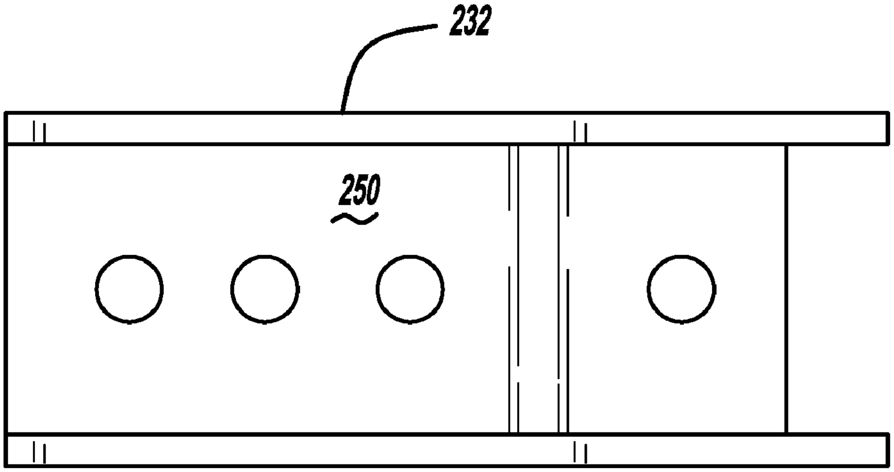
FIGS. 8B-8C are respectively enlarged front and top views of the C-pillar hinge mount of FIG. 8A.
Figure 8C:
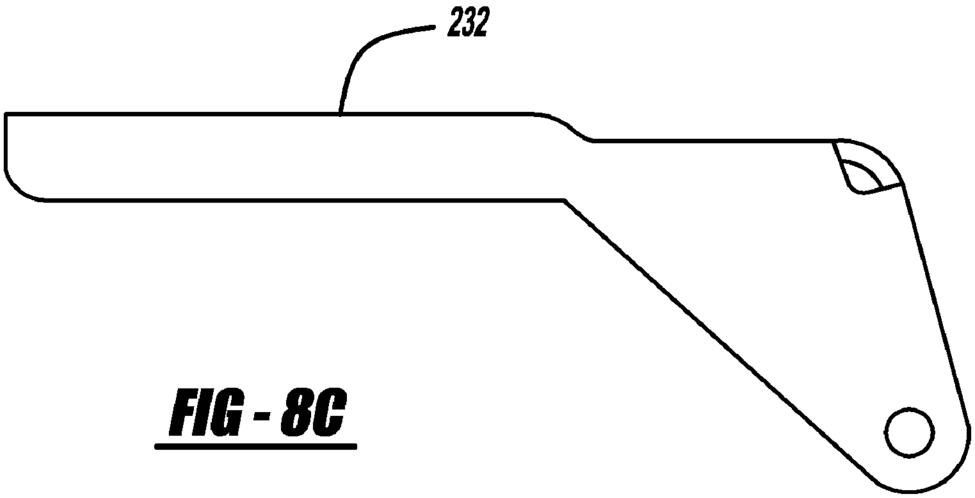
Figure 9A:
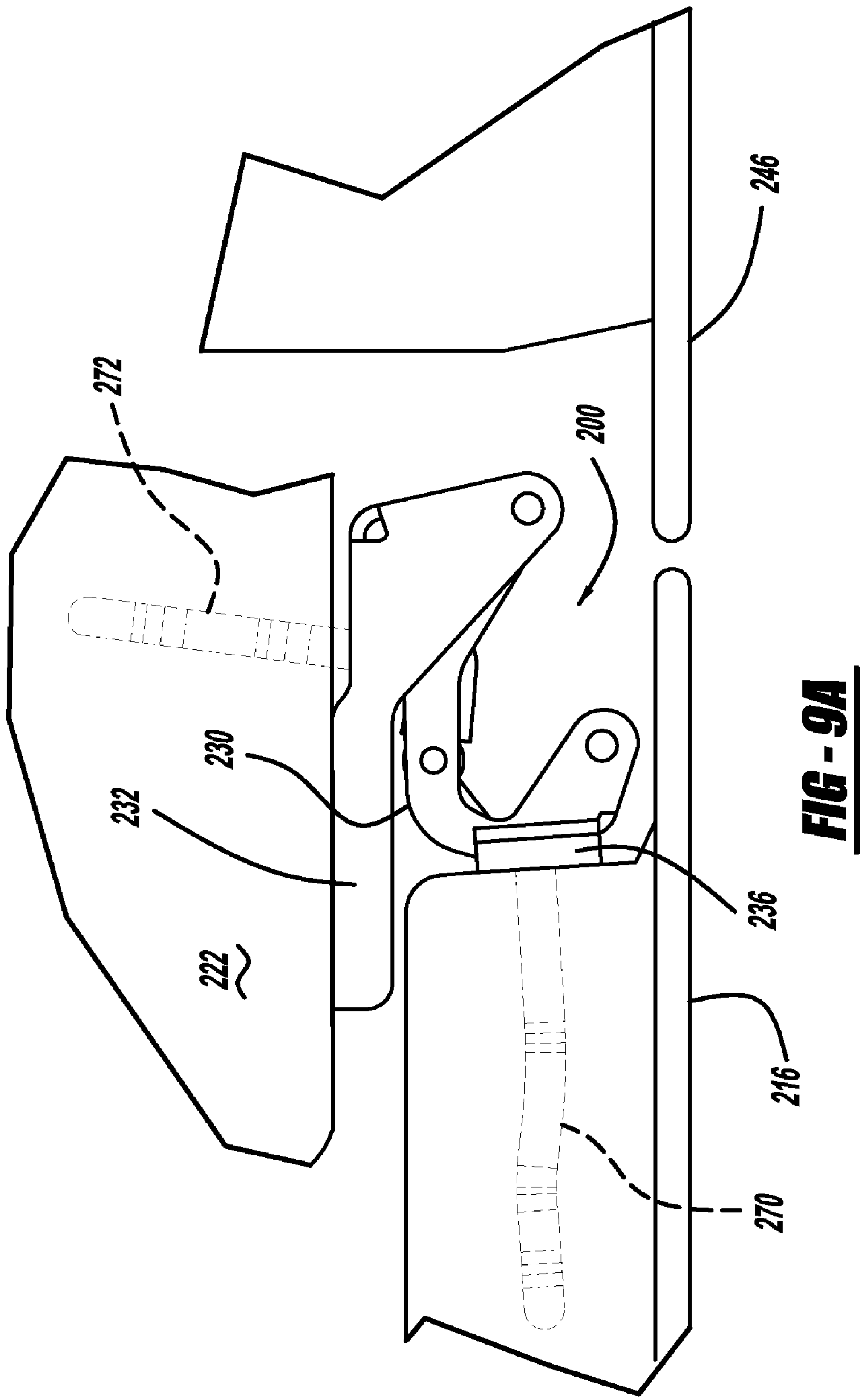
FIGS. 9A-9D are top views of a vehicle including the rear door articulating mechanism of FIG. 1, respectively illustrating the rear vehicle door in closed, and midway (approximately 60° and 125°) and fully (approximately 180°) opened positions.
Figure 9B:
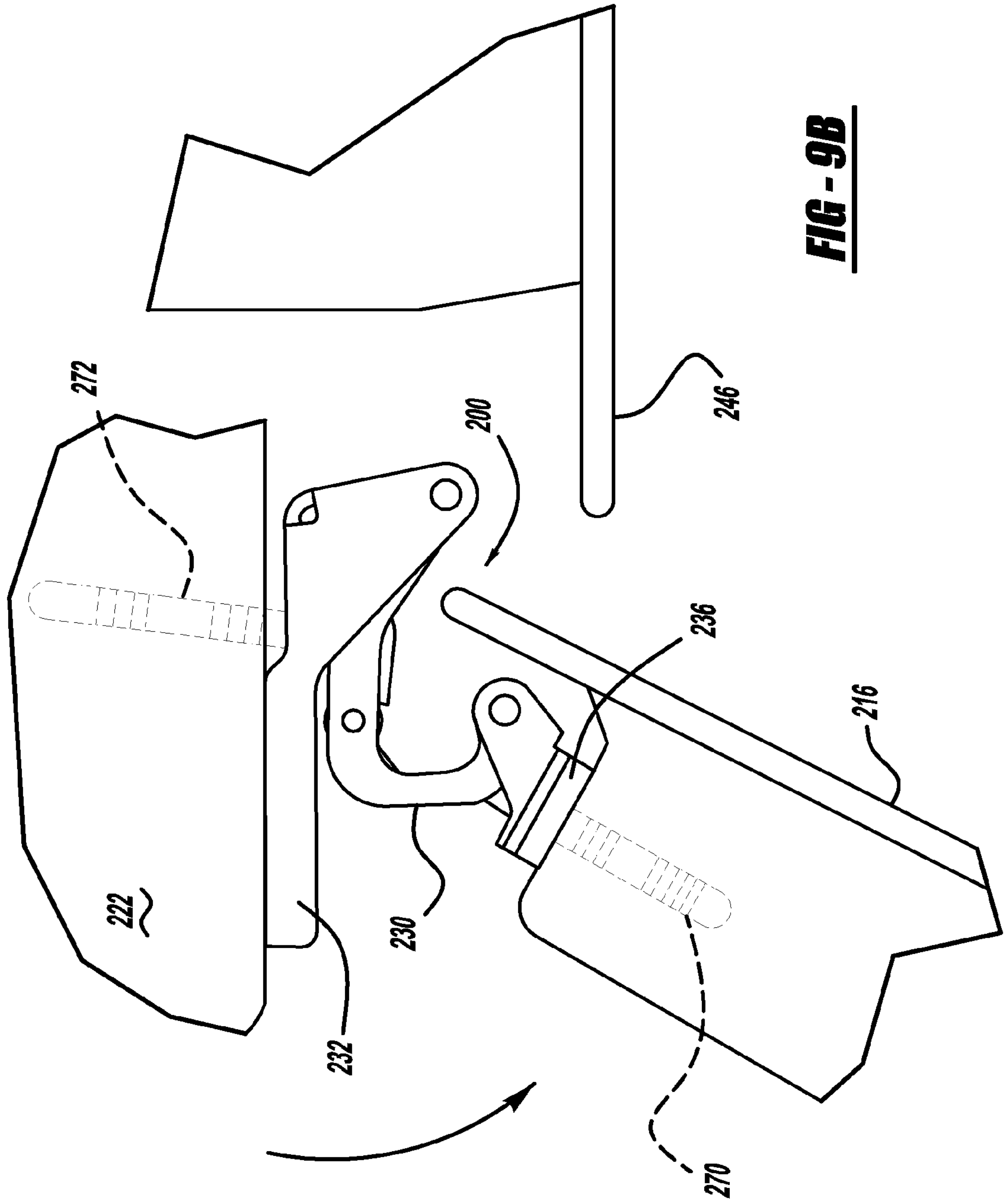
Figure 9C:
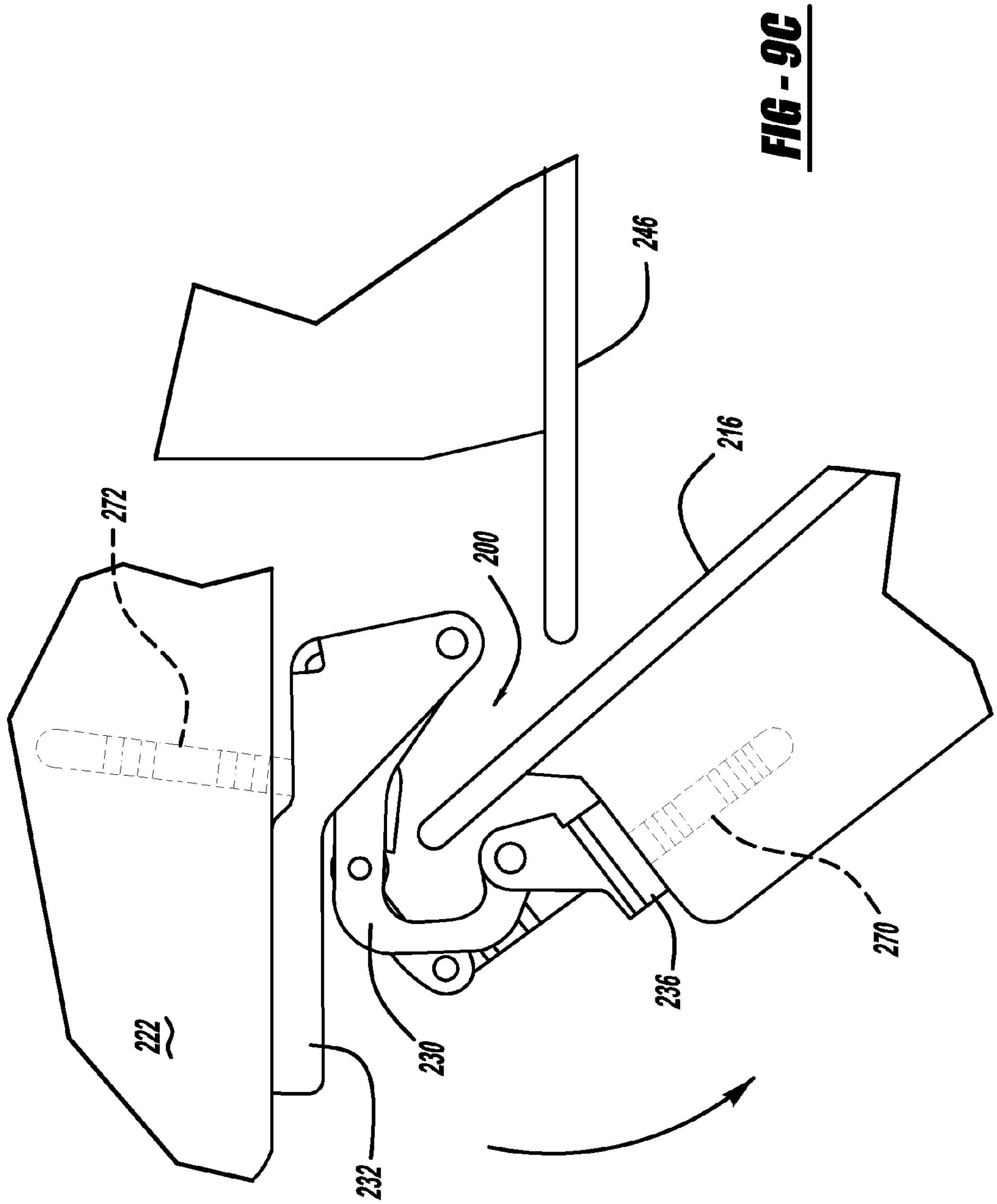
Figure 9D:
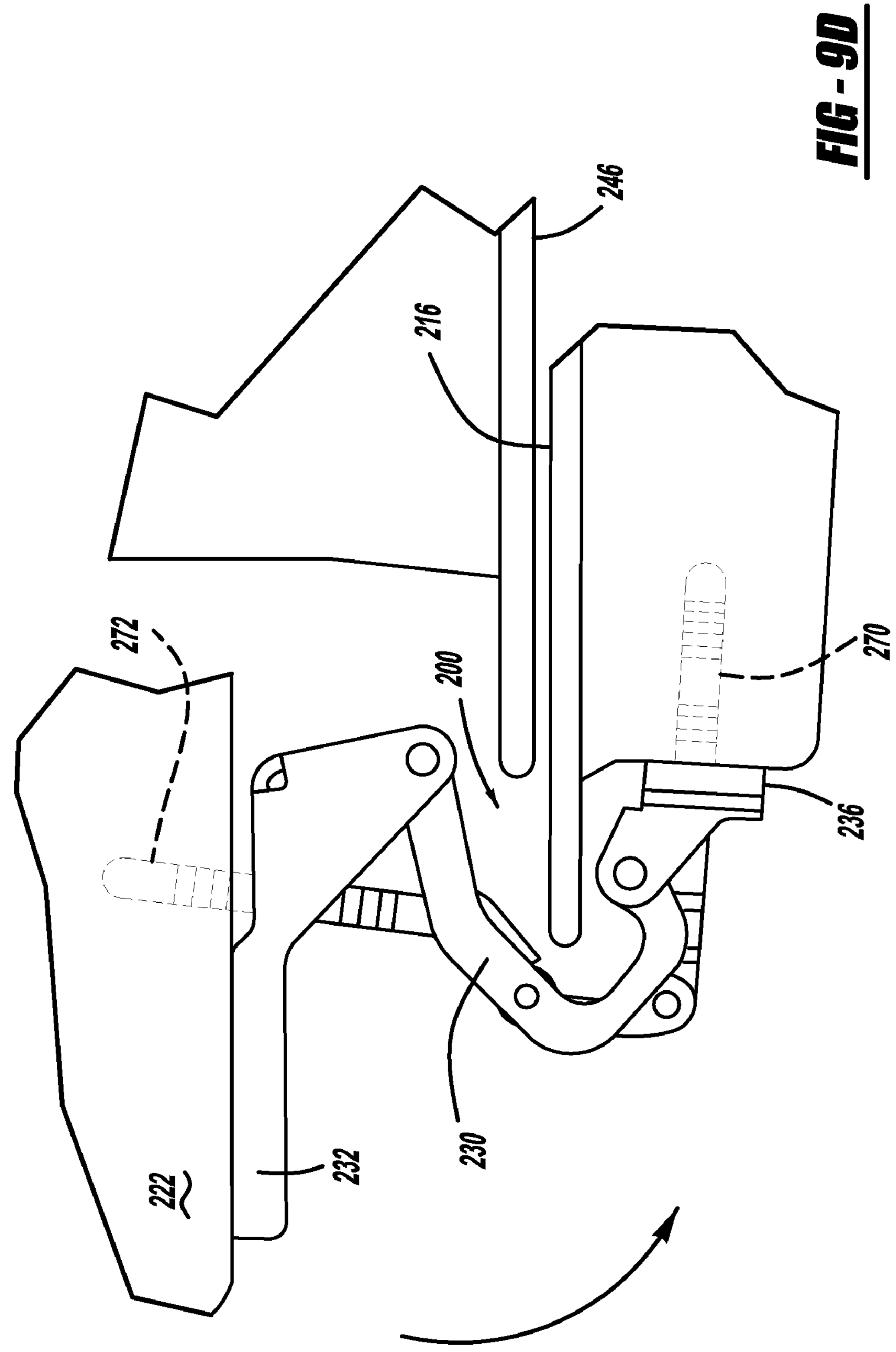
Figure 10A:
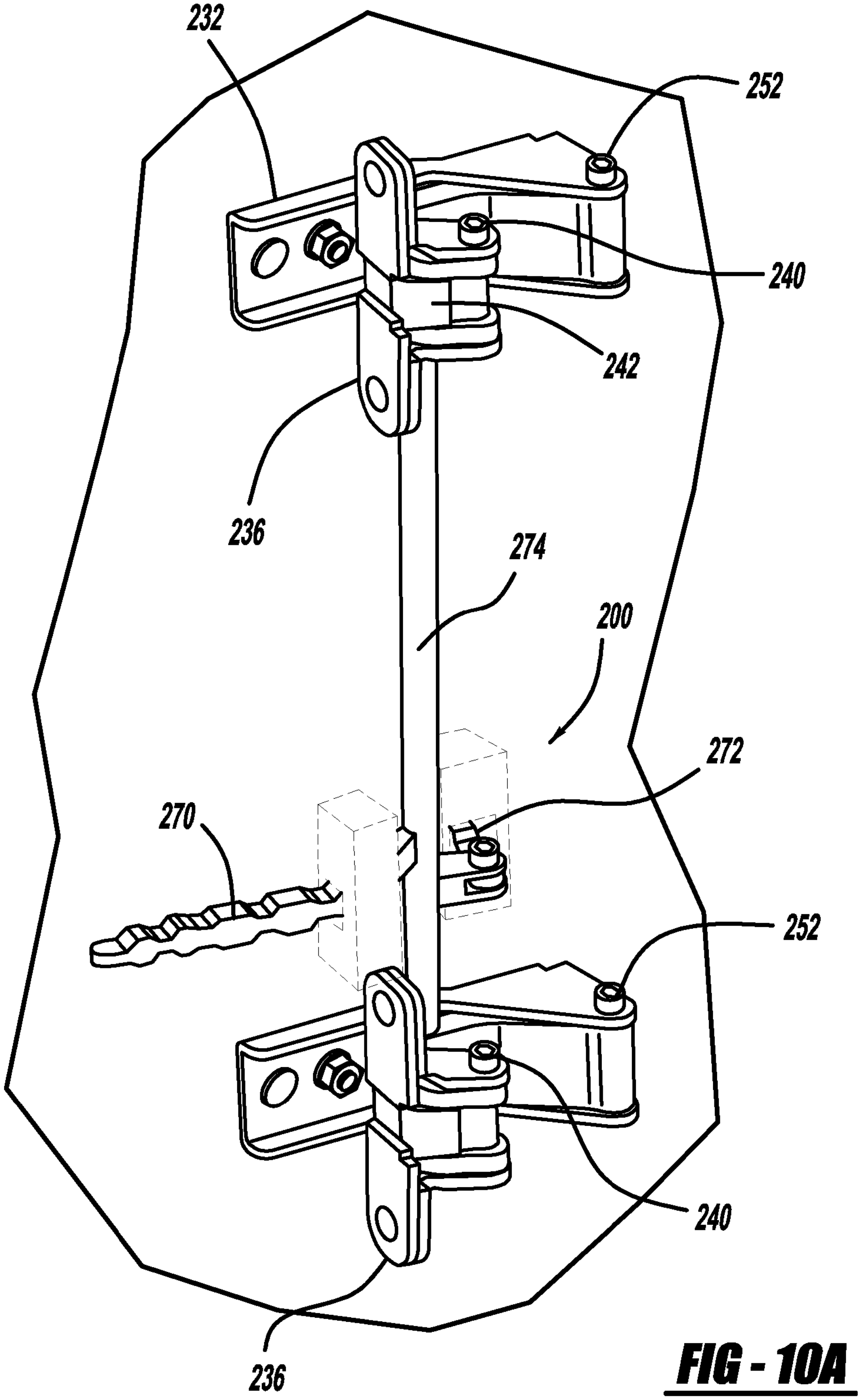
FIGS. 10A-10D are isometric views of a vehicle including the rear door articulating mechanism of FIG. 1, respectively illustrating the rear vehicle door in closed, and midway (approximately 60° and 125°) and fully (approximately 180°) opened positions.
Figure 10B:
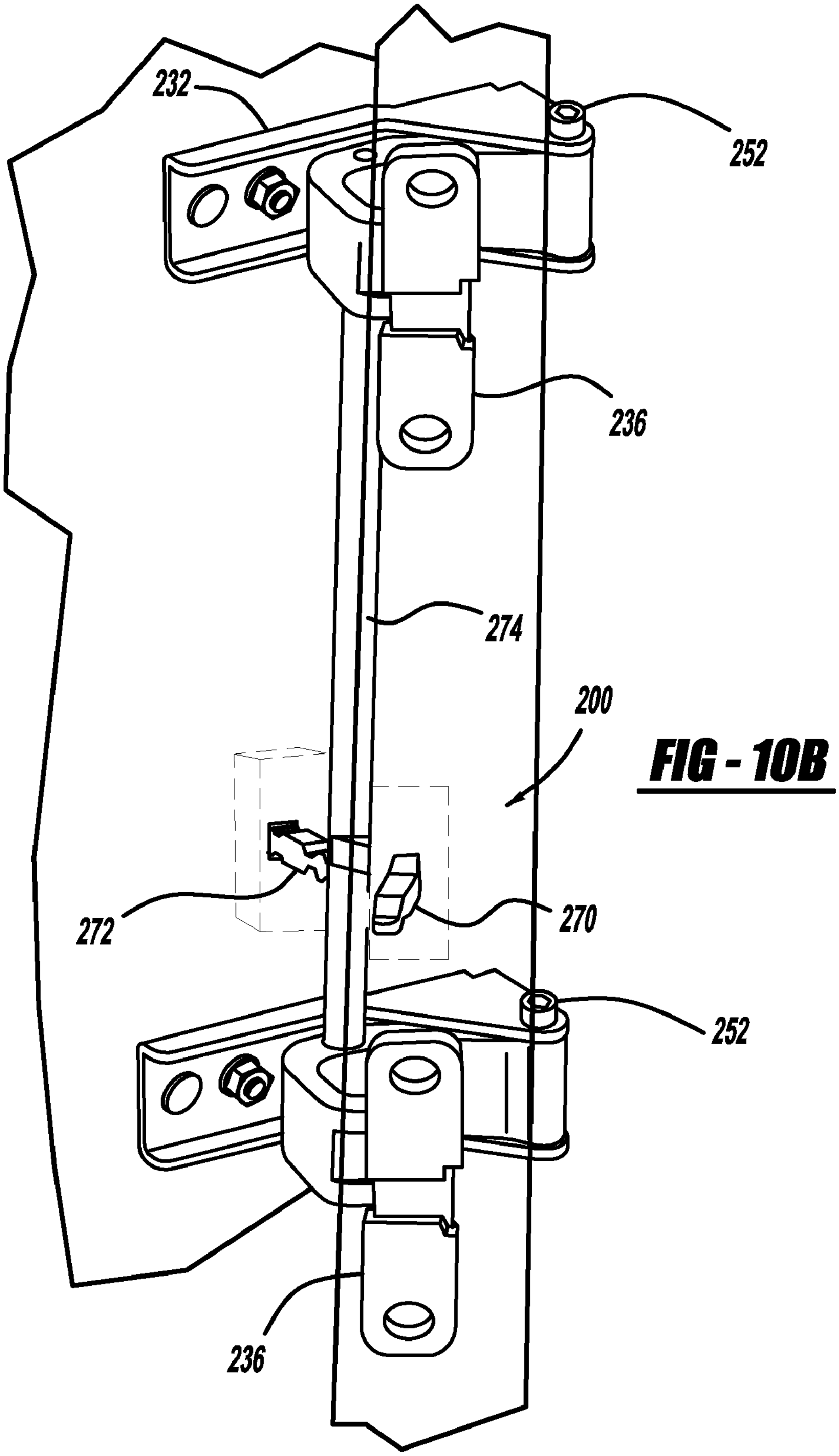
Figure 10C:
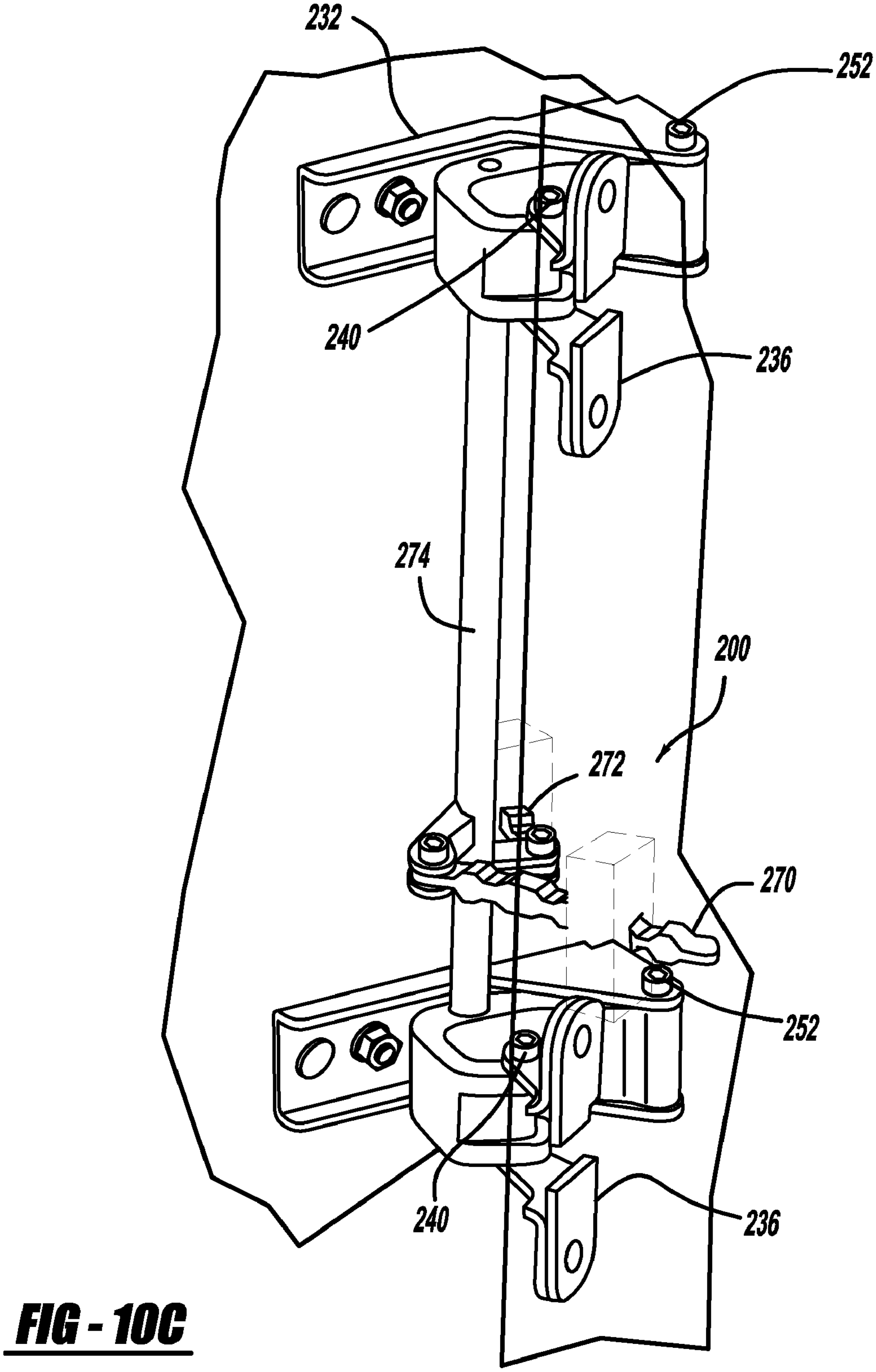
Figure 10D:
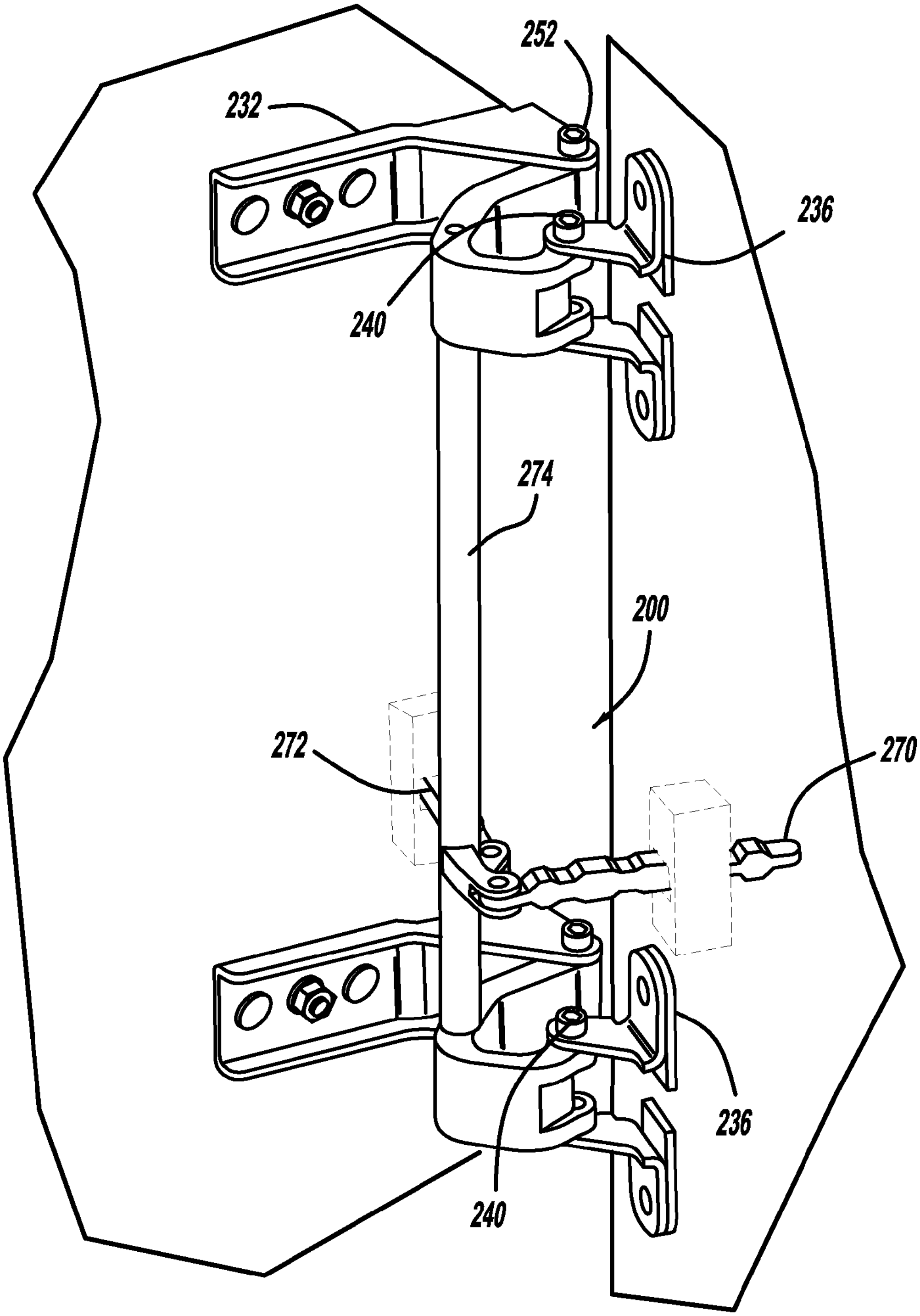
Figure 11:
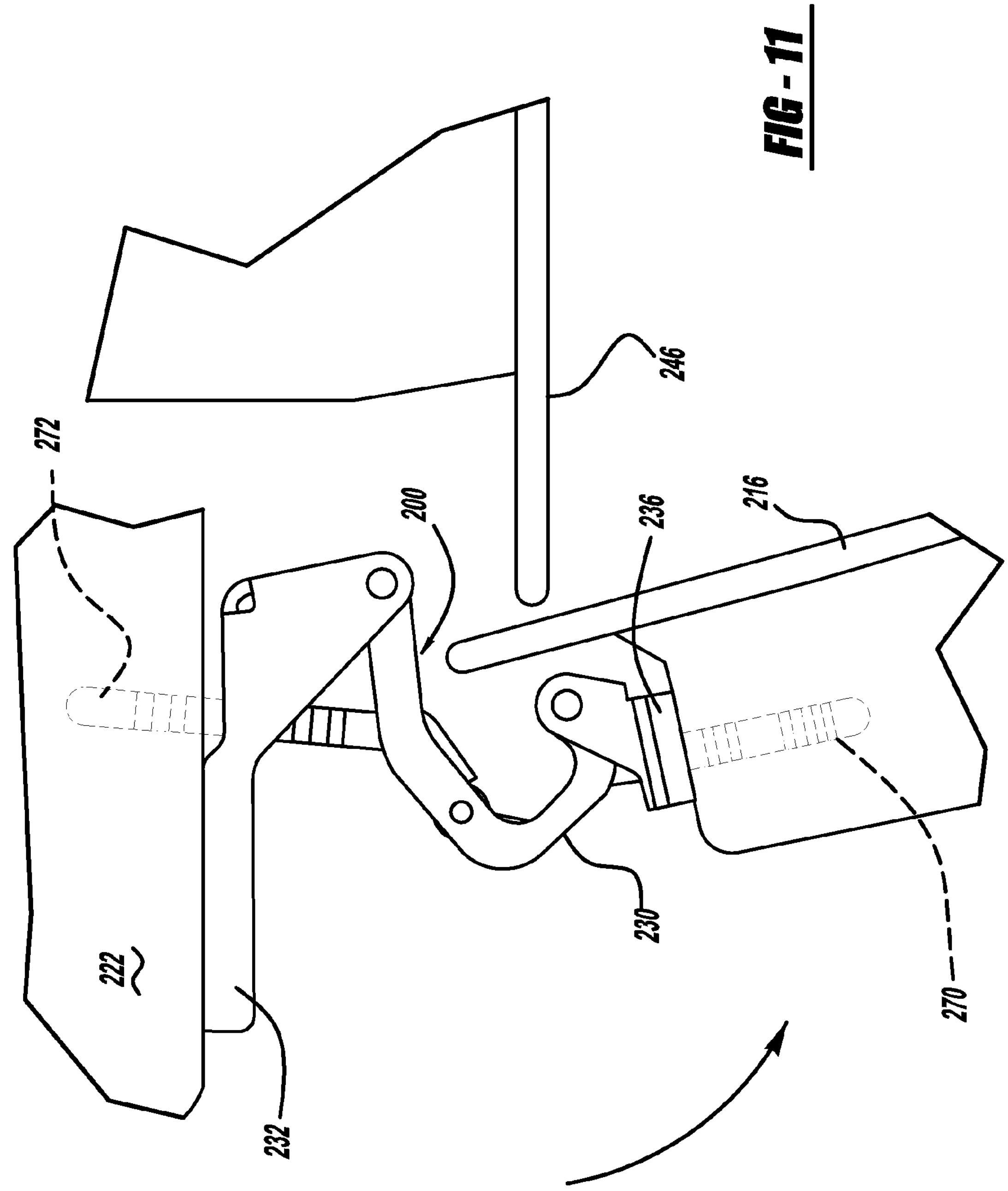
FIG. 11 is a top view of a vehicle including the rear door articulating mechanism of FIG. 1, illustrating the rear vehicle door in a 115° opening position.
Figure 12:
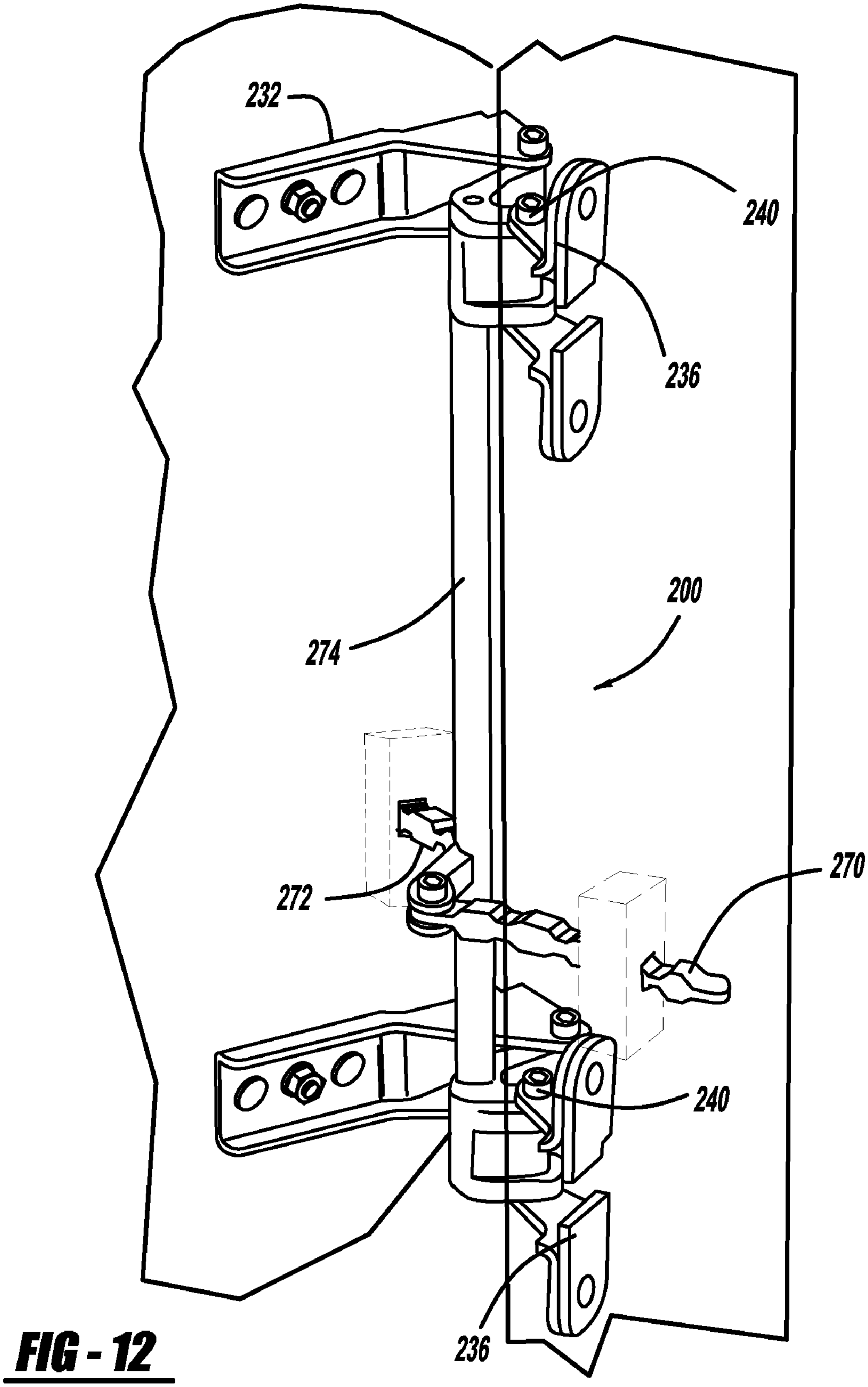
FIG. 12 is an isometric view of a vehicle including the rear door articulating mechanism of FIG. 1, illustrating the rear vehicle door in a 115° opening position.

Referring to FIGS. 8A-8C, C-pillar hinge mount 232 may include a C-pillar mount bracket 250 for attachment of C-pillar hinge mount 232 to C-pillar 222 by means of screws, bolts, or by other means such as welding and the like. C-pillar hinge mount 232 may also include pivot pin 252 for pivotal connection at end 228 of hinge arm 230.

Figure 7A:
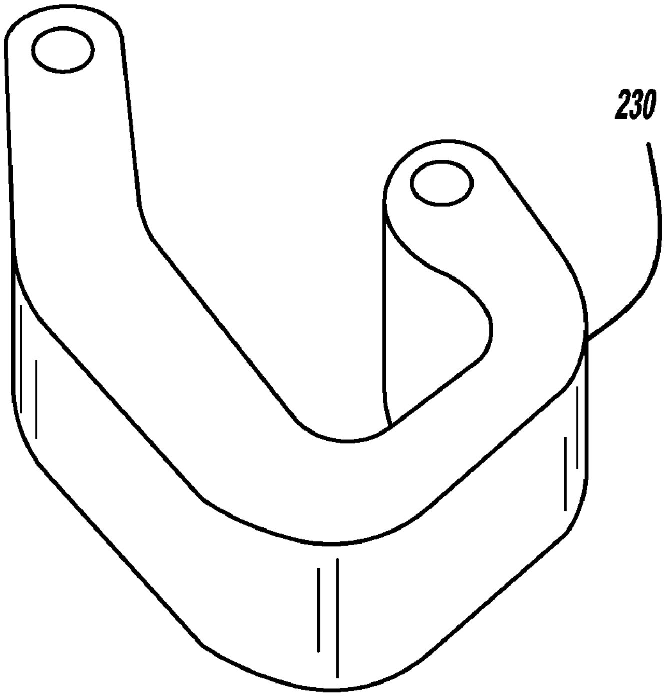
FIG. 7A is an enlarged isometric view of a hinge arm for controlling pivotal movement of a rear vehicle door.
Figure 7B:
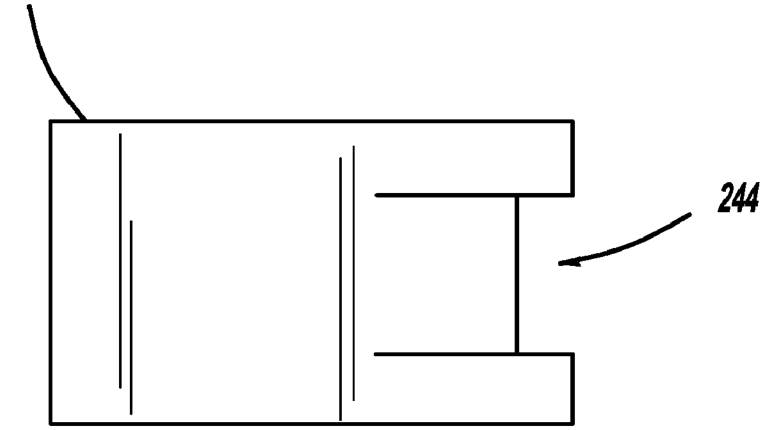
FIGS. 7B-7C are respectively enlarged front and top views of the hinge arm of FIG. 7A.
Figure 7C:
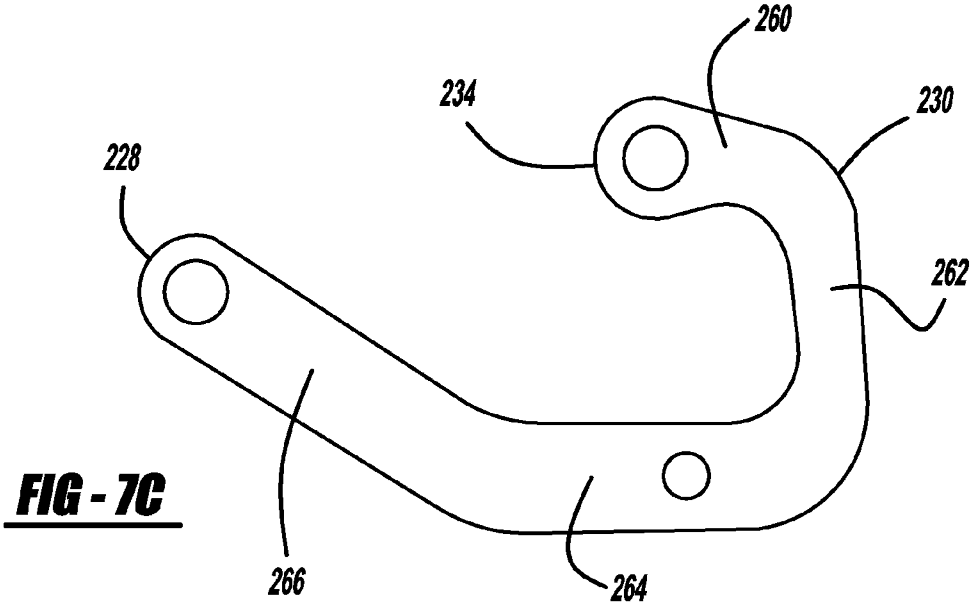

As briefly discussed above, hinge arm 230 may generally include a curved profile including sections 260, 262, 264 and 266. As shown in FIGS. 7A-7C, sections 260, 262, 264 and 266 may each include a different thickness for guiding predetermined opening/closing of rear door 216. Notably, section 266 may include a triangular profile for guiding predetermined opening/closing of rear door 216 and for providing adequate rigidity for supporting rear door 216.

Referring to FIGS. 5 and 10A-10D, in order to limit opening of rear door 216 at predetermined angles relative to the rear door initial closed position, door check straps 270, 272 may be provided. Door check strap 270 (i.e. hinge to door body check strap) may be pivotally connected to tie-bar 274 at one end thereof at location 276 on the tie-bar and to ball detents (not shown) disposed within rear door 216. The ball detents may be engageable with concave engagement recesses 278, 280 provided on door check strap 270, to thus limit opening of door 216 at approximately 60° and 125° (i.e. 65° additional to the first stop at 60°) relative to the rear door initial closed position. In a similar manner, door check strap 272 may be pivotally connected to tie-bar 274 at one end thereof at location 282 on the tie-bar and to ball detents (not shown) disposed within the vehicle body adjacent C-pillar 222. It should be noted that instead of being connected to tie-bar 274, door check straps 270, 272 may be connected to any part of the hinge assembly, as would be readily apparent to those skilled in the art. The ball detents may be engageable with a concave engagement recess 284 provided on door check strap 272, to thus limit opening of door 216 at approximately 180° (i.e. 55° in addition to the 125° stop provided by door check strap 270) relative to the rear door initial closed position. As readily evident to those skilled in the art, door check straps 270, 272 may be modified as needed for additional stops for door 216.

Referring to FIGS. 1 and 10A-10D, in the exemplary embodiment illustrated, articulating hinge assembly 226 may include upper and lower hinge arms 230 with cooperating door and C-pillar hinge mounts 236, 232, with the upper and lower hinge arms 230 being interconnected by a tie-bar 274 as discussed above.

The unsequenced opening/closing of rear door 216 will now be described in detail with reference to FIGS. 9A-12.

In order to open rear door 216, a user may simply pull on the door handle (similar to the handle shown in FIG. 1) to first open door 216 to the approximately 60° (FIGS. 9B, 10B) and 125° (FIGS. 9C, 10C) stop positions provided by door check strap 270 and then continue opening to the complete 180° (FIGS. 9D, 10D) stop position provided by door check strap 272. Alternatively, since hinge assembly 226 provides for unsequenced opening/closing of door 216, a user may apply a force to open door 216 to 55° to the stop position provided by door check strap 272, and thereafter continue opening of door 216 to the further 115° (FIGS. 11, 12) and 180° stop positions provided by door check strap 270. A user may also apply a force to open door 216 to a 60° stop position provided by door check strap 270, then to a 115° stop position provided by door check strap 272, and then finally to a 180° stop position provided by door check strap 270. As readily evident to those skilled in the art in view of this disclosure, other combinations of opening door 216 may be provided based on the stops provided by door check straps 270, 272. Yet further, door check straps 270, 272 may also allow for opening of door 216 in a manner where one stop may engage while door 216 is being moved before door 216 reaches the predetermined stop angle (i.e. while door 216 is being opened to the 60° stop position provided by door check strap 270, the 55° stop position provided by door check strap 272 may engage).

In order to close door 216, a user may simply reverse the afore-described door opening direction to first close door 216 from its 180° fully open position to either its 125° position provided by door check strap 272 or its 115° position provided by door check strap 270. If door 216 is disposed in the 125° position provided by door check strap 272, the user may continue closing of door 216 to its 60° and 0° positions provided by door check strap 270. Alternatively, if door 216 is disposed in the 115° position provided by door check strap 270, the user may continue closing of door 216 to its 60° position provided by door check strap 272 and then to its 0° position provided by door check strap 270, or alternatively, to its 55° position provided by door check strap 270 and then to its 0° position provided by door check strap 272.

Thus, based on the discussion above, check straps 270, 272 provide for unsequenced opening/closing of door 216.

It should be noted that while articulating hinge assembly 226 provides for unsequenced opening/closing of door 216, if sequenced opening/closing is desired, adequate lock-outs may be added to hinge arm 230 for providing sequenced opening/closing at 60°, 125° and 180°, and vise-versa.

To summarize, the invention thus provides rear door articulating mechanism 200 for vehicle rear door articulation, with the system permitting opening and closing of a rear door at up to approximately 180° (or less based on the design of the components as would be readily evident to those skilled in the art) relative to the door initial closed position. The system requires minimal modification of a vehicle structure, in that, components such as hinge arm 230, and door and C-pillar hinge mounts 236, 232 can be installed by minimal modification to a C-pillar area or the rear door structure. The invention facilitates ease of ingress and egress and allows maximum access for loading and unloading of transportable items. Based on the discussion above, the mode of opening of rear door 216 is not constrained by parking lot restrictions. Thus, parking lot entrapment, which prevents access to the door openings in such situations, is thereby avoided.

Those skilled in the art would readily appreciate in view of this disclosure that various modifications could be made to the aforementioned components, without departing from the scope of the present invention. For example, as discussed above, whereas mechanism 200 has been described and illustrated as including an articulating hinge assembly 226 including parallel disposed upper and lower hinge arms 230 (see FIGS. 1-3), additional or fewer hinge components (i.e. one or more pairs of hinge arms and related components) may be provided based on the stability and size of the rear door and related components. Further, whereas hinge arms 230 have been illustrated as including a generally J-shaped profile for facilitating predetermined articulation of rear door 216, the curvature of arm 230 may be varied as needed for controlling movement of door 216. Moreover, whereas door 216 has been discussed as being manually operable via a door handle, mechanism 200 may be used with an automatic door 216 operable, for example, by a remote or vehicle mounted push-button. Yet further, whereas mechanism 200 has been described as being usable with rear door 216 in the exemplary embodiment illustrated, it is readily evident that mechanism 200 may be usable with a vehicle front, middle or other doors, or with a compartment closure (i.e. broadly a vehicle door for the occupant compartment or another compartment for storing objects), or a tailgate assembly, for facilitating the afore-described articulating/sliding operation.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle rear door articulating mechanism comprising:

at least one articulating hinge assembly including:

at least one hinge arm pivotally mounted to a vehicle C-pillar at one end thereof via a C-pillar hinge mount and pivotally mounted to a vehicle rear door at another end thereof via a door hinge mount, said hinge arm including a generally J-shaped profile between said ends thereof for permitting articulation of the vehicle rear door up to approximately 180° from a rear door closed position, said door hinge mount including a door stop engageable with a stop surface on said hinge arm for limiting pivotal movement of the vehicle rear door, wherein the at least one articulating hinge assembly comprises an upper hinge assembly and a lower hinge assembly and the at least one hinge arm comprises an upper hinge arm and a lower hinge arm, and wherein the articulating mechanism further comprises a tie-bar connected to the upper and lower hinge arms for thereby providing rigidity for simultaneous operation of the upper and lower hinge assemblies, and further comprising at least one member extending generally perpendicular to the tie-bar and at least one door check strap pivotally connected to said tie-bar via the at least one member.

2. A vehicle rear door articulating mechanism according to claim 1, said door check strap including at least one recess engageable with a detent in a vehicle body for maintaining the rear door at a predetermined angle relative to a rear door initial closed position.

3. A vehicle rear door articulating mechanism according to claim 1, said door check strap including at least one recess engageable with a detent provided in the rear door for maintaining the rear door at a predetermined angle relative to a rear door initial closed position.

4. A vehicle rear door articulating mechanism according to claim 1, said door check strap including at least one recess engageable with a detent provided in the vehicle C-pillar for maintaining the rear door at a predetermined angle relative to a rear door initial closed position.

5. A vehicle rear door articulating mechanism according to claim 1, further comprising at least one first and second door check straps pivotally connected to said tie-bar, said first and second door check straps each including at least one recess and each recess being respectively engageable with a detent provided in the rear door and the vehicle C-pillar for maintaining the rear door at predetermined angles relative to a rear door initial closed position and allowing pivotal movement of the rear door between rear door opening and closing directions, said predetermined angles being selectable by a user based on a force applied for opening and closing the rear door.

6. A vehicle rear door articulating mechanism according to claim 5, wherein said first door check strap includes two recesses, and said second door check strap includes one recess, said recesses permitting unsequenced pivotal movement of the rear door between the rear door opening and closing directions.

7. A vehicle door articulating mechanism comprising:

at least one articulating hinge assembly including:

at least one hinge arm pivotally mounted to a vehicle body structure at one end thereof via a body structure hinge mount and pivotally mounted to a vehicle door at another end thereof via a door hinge mount, said hinge arm including a generally curved profile between said ends thereof for permitting articulation of the door up to a predetermined angle from a door closed position, said door hinge mount including a door stop engageable with a stop surface on said hinge arm for limiting pivotal movement of the vehicle door, wherein the at least one articulating hinge assembly comprises an upper hinge assembly and a lower hinge assembly and the at least one hinge arm comprises an upper hinge arm and a lower hinge arm, and wherein the articulating mechanism further comprises a tie-bar connected to the upper and lower hinge arms for thereby providing rigidity for simultaneous operation of the upper and lower hinge assemblies, and further comprising at least one member extending generally perpendicular to the tie-bar and at least one door check strap pivotally connected to said tie-bar via the at least one member.

8. A vehicle door articulating mechanism according to claim 7, said door check strap including at least one recess engageable with a detent in a vehicle body for maintaining a door at a predetermined angle relative to the door initial closed position.

9. A vehicle door articulating mechanism according to claim 7, said door check strap including at least one recess engageable with a detent provided in the door for maintaining the door at a predetermined angle relative to a door initial closed position.

10. A vehicle door articulating mechanism according to claim 7, said door check strap including at least one recess engageable with a detent provided in the vehicle body structure for maintaining the door at a predetermined angle relative to a door initial closed position.

11. A vehicle door articulating mechanism according to claim 7, further comprising at least one first and second door check straps pivotally connected to said tie-bar, said first and second door check straps each including at least one recess and each recess being respectively engageable with a detent provided in the door and the vehicle body structure for maintaining the door at predetermined angles relative to a door initial closed position and allowing pivotal movement of the door between door opening and closing directions, said predetermined angles being selectable by a user based on a force applied for opening and closing the door.

12. A vehicle door articulating mechanism according to claim 11, wherein said first door check strap includes two recesses, and said second door check strap includes one recess, said recesses permitting pivotal movement of the door between the door opening and closing directions.

13. A vehicle compartment closure articulating mechanism comprising:

at least one articulating hinge assembly including:

at least one hinge arm pivotally mounted to a vehicle body structure at one end thereof via a body structure hinge mount and pivotally mounted to a vehicle compartment closure at another end thereof via a compartment closure hinge mount, said hinge arm including a generally curved profile between said ends thereof for permitting articulation of the compartment closure up to a predetermined angle from a compartment closure closed position, said compartment closure hinge mount including a stop engageable with a stop surface on said hinge arm for limiting pivotal movement of the vehicle compartment closure, wherein the at least one articulating hinge assembly comprises a first hinge assembly and a second hinge assembly and the at least one hinge arm comprises first and second hinge arms, and wherein the articulating mechanism further comprises a tie-bar connected to the first and second hinge arms for thereby providing rigidity for simultaneous operation of the first and second hinge assemblies, and further comprising at least one member extending generally perpendicular to the tie-bar and at least one check strap pivotally connected to said tie-bar via the at least one member.

14. A vehicle compartment closure articulating mechanism according to claim 13, said check strap including at least one recess engageable with a detent in a vehicle body for maintaining the compartment closure at a predetermined angle relative to a compartment closure initial closed position.

15. A vehicle compartment closure articulating mechanism according to claim 13, said check strap including at least one recess engageable with a detent provided in the compartment closure for maintaining the compartment closure at a predetermined angle relative to a compartment closure initial closed position.

16. A vehicle compartment closure articulating mechanism according to claim 13, said check strap including at least one recess engageable with a detent provided in the vehicle body structure for maintaining the compartment closure at a predetermined angle relative to a compartment closure initial closed position.

17. A vehicle compartment closure articulating mechanism according to claim 13, further comprising at least one first and second check straps pivotally connected to said tie-bar, said first and second check straps each including at least one recess and each recess being respectively engageable with a detent provided in the compartment closure and the vehicle body structure for maintaining a compartment closure at predetermined angles relative to the compartment closure initial closed position and allowing pivotal movement of the compartment closure between compartment closure opening and closing directions, said predetermined angles being selectable by a user based on a force applied for opening and closing the compartment closure.

18. A vehicle compartment closure articulating mechanism according to claim 17, wherein said first check strap includes two recesses, and said second check strap includes one recess, said recesses permitting pivotal movement of the compartment closure between the compartment closure opening and closing directions.

19. A vehicle door articulating hinge assembly comprising:

upper and lower generally J-shaped hinge arms each pivotally mounted to a vehicle body hinge mount and a vehicle door via a vehicle door hinge mount, the upper and lower hinge arms permitting articulation of the vehicle door up to approximately 180° from a door closed position, said door hinge mount including a door stop engageable with a stop surface on the hinge arm for limiting pivotal movement of the vehicle door;

a tie-bar connecting the upper and lower hinge arms;

at least one extending member from the tie-bar; and at least one door check strap pivotally connected to said tie-bar via the at least one member.

20. The vehicle door articulating hinge assembly as claimed in claim 19, wherein the at least one member comprises at least one arm extending generally perpendicular to the tie-bar.

21. A vehicle door articulating hinge assembly comprising:

upper and lower generally curved hinge arms each pivotally mounted to a vehicle body hinge mount and a vehicle door via a vehicle door hinge mount for permitting articulation of the vehicle door up to approximately 180° from a door closed position;

a tie-bar connecting the upper and lower hinge arms;

a member extending from the tie-bar; and a door check strap pivotally connected to said member.

22. The vehicle door articulating hinge assembly according to claim 21, wherein the member comprises an arm extending generally perpendicular to the tie-bar.

* * * * *